US012097528B2

(12) United States Patent
Hemes et al.

(10) Patent No.: US 12,097,528 B2
(45) Date of Patent: Sep. 24, 2024

(54) ROBOTIC REPAIR CONTROL SYSTEMS AND METHODS

(71) Applicant: 3M INNOVATIVE PROPERTIES COMPANY, St. Paul, MN (US)

(72) Inventors: Brett R. Hemes, Woodbury, MN (US); Mark W. Orlando, Chesterfield Township, MI (US); Daniel M. Bodily, Woodbury, MN (US); Jonathan B. Arthur, Hudson, WI (US); Nathan J. Herbst, Woodbury, MN (US); Thomas J. Strey, River Falls, WI (US); Aaron K. Nienaber, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 17 days.

(21) Appl. No.: 17/756,444

(22) PCT Filed: Nov. 24, 2020

(86) PCT No.: PCT/IB2020/061074
§ 371 (c)(1),
(2) Date: May 25, 2022

(87) PCT Pub. No.: WO2021/105865
PCT Pub. Date: Jun. 3, 2021

(65) Prior Publication Data

US 2023/0001448 A1 Jan. 5, 2023

Related U.S. Application Data

(60) Provisional application No. 62/941,286, filed on Nov. 27, 2019.

(51) Int. Cl.
*B05D 5/00* (2006.01)
*B05D 3/00* (2006.01)
(Continued)

(52) U.S. Cl.
CPC ............. *B05D 5/005* (2013.01); *B05D 3/007* (2013.01); *B05D 3/12* (2013.01); *B24B 19/26* (2013.01); *B24B 51/00* (2013.01)

(58) Field of Classification Search
CPC .......... B05D 5/005; B05D 3/007; B05D 3/12; B24B 19/26; B24B 51/00
(Continued)

(56) References Cited

U.S. PATENT DOCUMENTS 5,185,013 A * 2/1993 Martin ................ E04G 23/0214 52/742.16
9,971,339 B2 5/2018 Maloney et al.
(Continued)

FOREIGN PATENT DOCUMENTS

CN 102201020 A * 9/2011 ......... G06F 17/5018
DE 102015119240 B3 * 3/2017 ............. B24B 51/00
(Continued)

OTHER PUBLICATIONS

Industrial_robot_path_planning_for_polishing_applications. Jiang Liu, Xinlong Huang, Siwen Fang, Heping Chen, Ning Xi (Year: 2016).*
(Continued)

*Primary Examiner* — B M M Hannan

(57) ABSTRACT

A repaired area on a work surface is presented. The repaired area includes a repairboundary. Within the repairboundary, the work surface has a repair texture and, outside of the repair boundary, the work surface has a work surface texture. The repaired area also includes a repair depth distribution within the repair boundary and a concealing feature. The repaired area is a result of a robotic repair executed on the work surface to remove a defect.

20 Claims, 25 Drawing Sheets

(51) Int. Cl.

*B05D 3/12* (2006.01)
*B24B 19/26* (2006.01)
*B24B 51/00* (2006.01)

(58) Field of Classification Search

USPC .......................................................... 700/245

See application file for complete search history.

(56) References Cited

U.S. PATENT DOCUMENTS

| | | | | |
|---|---|---|---|---|
| 2003/0139836 | A1* | 7/2003 | Matthews | B05D 5/005 700/109 |
| 2003/0155067 | A1* | 8/2003 | Syron | B29C 63/0056 156/252 |
| 2003/0182006 | A1* | 9/2003 | Shin | C25D 21/12 700/117 |
| 2005/0163921 | A1 | 7/2005 | Looper et al. | |
| 2006/0242820 | A1* | 11/2006 | Townsend | G06T 7/521 29/703 |
| 2008/0314500 | A1* | 12/2008 | Boers | B05D 5/06 156/60 |
| 2009/0186556 | A1 | 7/2009 | Hermann et al. | |
| 2016/0325490 | A1* | 11/2016 | Safai | B29C 35/0261 |
| 2018/0326591 | A1* | 11/2018 | Häusler | G01B 11/24 |
| 2019/0096057 | A1* | 3/2019 | Allen | G01N 21/8851 |
| 2020/0117842 | A1* | 4/2020 | Patankar | G06F 30/15 |
| 2021/0394218 | A1* | 12/2021 | Gagne | B05D 5/005 |
| 2022/0222765 | A1* | 7/2022 | Unnerstall | B24B 21/008 |

FOREIGN PATENT DOCUMENTS

| | | | | | |
|---|---|---|---|---|---|
| JP | 2003181768 | A | * | 7/2003 | |
| KR | 20130044470 | A | * | 5/2013 | |
| KR | 101373508 | B1 | | 3/2014 | |
| WO | WO2019112040 | A1 | * | 6/2019 | |
| WO | WO-2020239198 | A1 | * | 12/2020 | B24B 19/26 |
| WO | 2021105867 | A1 | | 6/2021 | |
| WO | 2021105876 | A1 | | 6/2021 | |
| WO | WO-2022240929 | A1 | * | 11/2022 | B24B 19/26 |

OTHER PUBLICATIONS

Hemes, “Cut-based Trajectories for Robotic Surface Repair”, 6 pages.

International Search Report for PCT International Application No. PCT/IB2020/061074, malled on Mar. 5, 2021, 5 pages.

* cited by examiner

ROBOTIC REPAIR CONTROL SYSTEMS AND METHODS

CROSS REFERENCE TO RELATED APPLICATIONS

This application is a national stage filing under 35 U.S.C. 371 of PCT/IB2020/061074, filed Nov. 24, 2020, which claims the benefit of U.S. Provisional Application No. 62/941,286, filed Nov. 27, 2019, the disclosure of which is incorporated by reference in its/their entirety herein.

BACKGROUND

Clear coat repair is one of the last operations to be automated in the automotive original equipment manufacturing (OEM) sector. Techniques are desired for automating this process as well as other paint applications (e.g., primer sanding, clear coat defect removal, clear coat polishing, etc.) amenable to the use of abrasives and/or robotic inspection and repair.

Prior efforts to automate the detection and repair of paint defects include the system described in US Patent Publication No. 2003/0139836, which discloses the use of electronic imaging to detect and repair paint defects on a vehicle body. The system references the vehicle imaging data against vehicle CAD data to develop three-dimensional paint defect coordinates for each paint defect. The paint defect data and paint defect coordinates are used to develop a repair strategy for automated repair using a plurality of automated robots that perform a variety of tasks including sanding and polishing the paint defect.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Recent advancements in imaging technology and computational systems has made feasible the process of clear coat inspection at production speeds. In particular, stereo deflectometry has recently been shown to be capable of providing images and locations of paint and clear coat defects at appropriate resolution with spatial information (providing coordinate location information and defect classification) to allow subsequent automated spot repair.

As used herein, the term "vehicle" is intended to cover a broad range of mobile structures that receive at least one coat of paint or clear coat during manufacturing. While many examples herein concern automobiles, it is expressly contemplated that methods and systems described herein are also applicable to trucks, trains, boats (with or without motors), airplanes, helicopters, etc.

The term "paint" is used herein to refer broadly to any of the various layers of e-coat, filler, primer, paint, clear coat, etc. of the vehicle that have been applied in the finishing process. Additionally, the term "paint repair" involves locating and repairing any visual artifacts (defects) on or within any of the paint layers. In some embodiments, systems and methods described herein use clear coat as the target paint repair layer. However, the systems and methods presented apply to any particular paint layer (e-coat, filler, primer, paint, clear coat, etc.) with little to no modification As used herein, the term "defect" refers to an area on a worksurface that interrupts the visual aesthetic. For example, many vehicles appear shiny or metallic after painting is completed. A "defect" can include debris trapped within one or more of the various paint layers on the work surface. Defects can also include smudges in the paint, excess paint including smears or dripping, as well as dents.

Paint repair is one of the last remaining steps in the vehicle manufacturing process that is still predominantly manual. Historically this is due to two main factors, lack of sufficient automated inspection and the difficulty of automating the repair process itself. Paint and clear coat repair standards surround aesthetics judged by the human eye—the dealership accepting the vehicle and the eventual customer who will inspect the vehicle prior to purchase. Robots are traditionally designed to provide a "perfect," or highly "regular" repair—with clear, defined edges and an even cut (see FIG. 4B). Unfortunately, this causes the repair to be highly visible to the human eye. Systems and methods described herein address ways to add irregularity to the paint repair process, such that repaired defects better blend into a vehicle surface and are less detectable by a customer.

Figure 1:
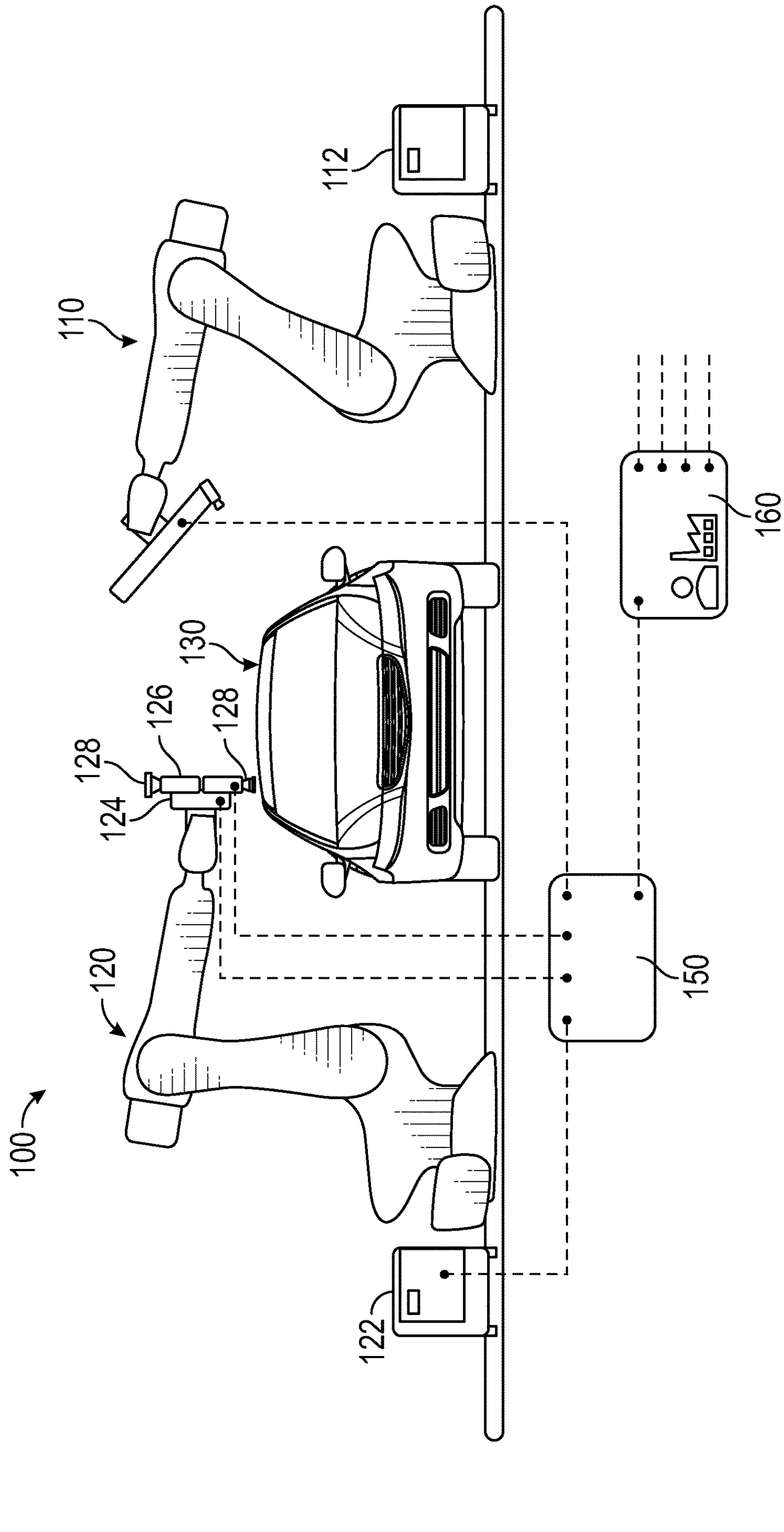
FIG. 1 is a schematic of a robotic paint repair system in which embodiments of the present invention are useful.

FIG. 1 is a schematic of a robotic paint repair system in which embodiments of the present invention are useful. System 100 generally includes two units, a visual inspection system 110 and a defect repair system 120. Both systems may be controlled by a motion controller 112, 122, respectively, which may receive instructions from one or more application controllers 150. The application controller may receive input, or provide output, to a user interface 160. Repair unit 120 includes a force control unit 124 that can be aligned with an end-effector 126. As illustrated in FIG. 1, end effector 126 includes two tools 128, as further described in co-pending application Nos. 62/940,950 and 62/940,960. However, other arrangements are also expressly contemplated.

The first of the two main challenges, inspection of vehicle 130 by inspection unit 110, is interesting due to the nature of the underlying problem domain. In general, the surface of interest is very large in comparison to the defects themselves, with the difference being multiple orders of magnitude. This results in trade-offs between field of view and resolution when it comes to sensor selection. Additionally, each paint layer of the finishing process (e-coat, primer, paint, clear coat, etc.) differs in its visual appearance with specularity being particular noteworthy. Highly specular surfaces (i.e., high-gloss) pose unique imaging challenges). These issues together make inspection difficult. Recent progress in the last few years has been made in this area making use of increasing computational resources, resulting in the availability of several commercial solutions. The presence of a sufficiently capable inspection system 110 is important for identifying defects for repair by repair unit 120.

The current state of the art in vehicle paint repair is to use fine abrasive and/or polish systems to manually sand/polish out the defects, with or without the aid of a power tool, while maintaining the desirable finish (e.g., matching specularity in the clear coat). An expert human executing such a repair leverages many hours of training while simultaneously utilizing their senses to monitor the progress of the repair and make changes accordingly. Such sophisticated behavior is hard to capture in a robotic solution with limited sensing.

Additionally, abrasive material removal is a pressure driven process while many industrial manipulators, in general, operate natively in the position tracking/control regime and are optimized with positional precision in mind. The result is extremely precise systems with extremely stiff error response curves (i.e., small positional displacements result in very large corrective forces) that are inherently bad at effort control (i.e., joint torque and/or Cartesian force)). Closed-loop force control approaches have been used (with limited utility) to address the latter along with more recent (and more successful) force controlled flanges that provide a soft (i.e., not stiff) displacement curve much more amenable to sensitive force/pressure-driven processing. The problem of robust process strategy/control, however, remains and is the focus of this work.

Figure 2:
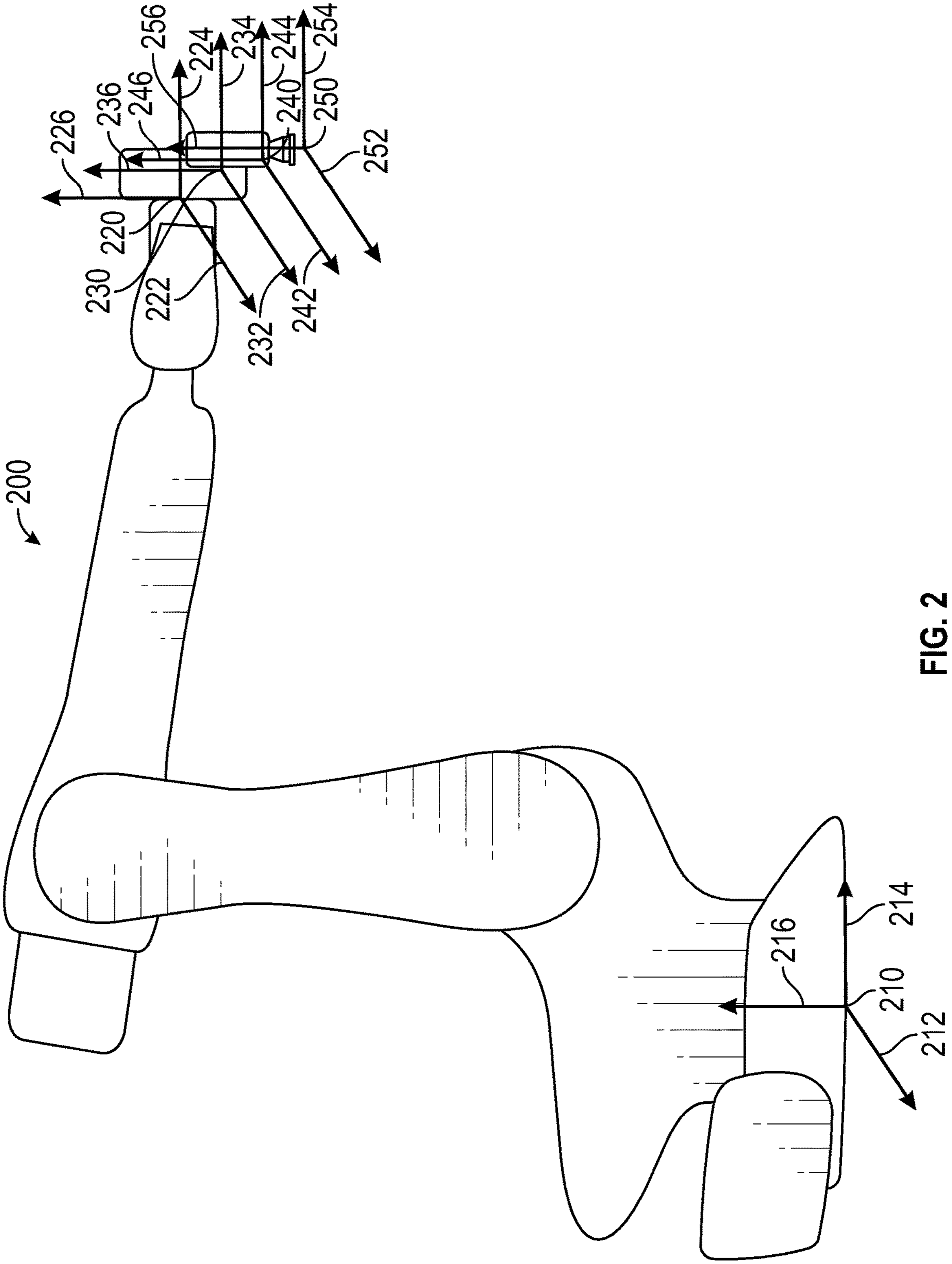
FIG. 2 is a schematic of a paint repair robot which may be useful in embodiments of the present invention.

FIG. 2 is a schematic of a paint repair robot which may be useful in embodiments of the present invention. A robotic repair unit 200 has a base 210, which may be stationary, in some embodiments. In other embodiments, base 210 can move in any of six dimensions, translations or rotations about an x-axis 212, y-axis 214 and/or z-axis 216. For example, robot 200 may have a base 210 fixed to a rail system configured to travel along with a vehicle being repaired. Depending on a defect location, robot 200 may need to move closer, or further away from a vehicle, or may need to move higher or lower with respect to the vehicle. A moveable base 200 may make repairing difficult to reach defects easier.

Robotic repair unit 200 has one or more tools 240 that can interact with a worksurface. Tool 240 may include a backup pad 250, in one embodiment, or another suitable abrasive tool. During an abrasive operation, tool 240 may have an abrasive disc, or other suitable abrasive article, attached using adhesive, hook and loop, clip system, vacuum or other suitable attachment system. However, as the abrasive article moves in conjunction with a backup pad 250 to which it is attached, the abrasive article is not necessarily considered as adding additional degrees of freedom to the movement of robotic repair unit 200. As mounted to the robotic repair unit 200, tool 240 has the ability to be positioned within the provided degrees of freedom by the robotic repair unit 200 (6 degrees of freedom in most cases) and any other degrees of freedom (e.g., a compliant force control 230 unit) with its reference frame depicted by axes 252, 254 and 256.

Backup pad 250 is coupled to a tool 240 which has an orbit that provides some additional degrees of freedom. In most tools a single degree of freedom is provided by a rotating shaft with or without some offset. The backup pad 250 reference frame is depicted by axes 252, 254, and 256. The tool 240 shaft reference frame is depicted by axes 242, 244, and 246. Tool 240 is coupled to a force control 230 unit output. Force controlled flange 230 provides a soft (i.e., not stiff) displacement curve. In most force control units, a single degree of freedom is provided by a sliding (prismatic) joint along the active axis. The force flange output reference frame is depicted by axes 222, 224, and 226. Force control 230 unit is coupled to a flange 220. Movement of components 210, 220, 230, 240 and 250 is all controllable using a robot controller (e.g., robot controller 122 shown in FIG. 1) and or some ancillary control (e.g., application controller 150).

It is possible to calculate a position of a specific abrasive grain within the context of an abrasive article coupled to backup pad 250 by transforming mathematically the position of the abrasive grain, in time, as a fixed point in the frame of the backup pad, to some other desired reference using a series of relative transformations between the aforementioned component frames (illustrated below in Equation 1 with respect to the base 210 frame).

$$M_{backuppad\ 250}{}^{base\ 210}(t)=M_{flang220}{}^{base\ 210}(t)\, M_{forcecontrol230}{}^{flange220}(t)\, M_{tool240}{}^{forcecontrol230}(t)\, M_{backuppad\ 250}{}^{tool240}(t) \quad \text{Equation 1}$$

Movement (M) of backup pad 250 frame, with respect to a stationary base 210 over time is affected by movement of flange 220 over time (e.g., robot macro-motion), reflected in the first term, movement of force control 230 over time (e.g., compliant linear displacement), as reflected by the second term, movement of the tool 240 over time (e.g., shaft rotation), as reflected by the third term, and rotation of the backup pad, with respect to the tool 240 over time. The first, second, and third terms are indicative of a repair trajectory, as discussed in greater detail below. The fourth term is indicative of rotational movement of backup pad 250 (e.g., passive rotation on a random orbital setup). Describing and controlling the complex motion is essential to managing the repair process.

Figure 3:
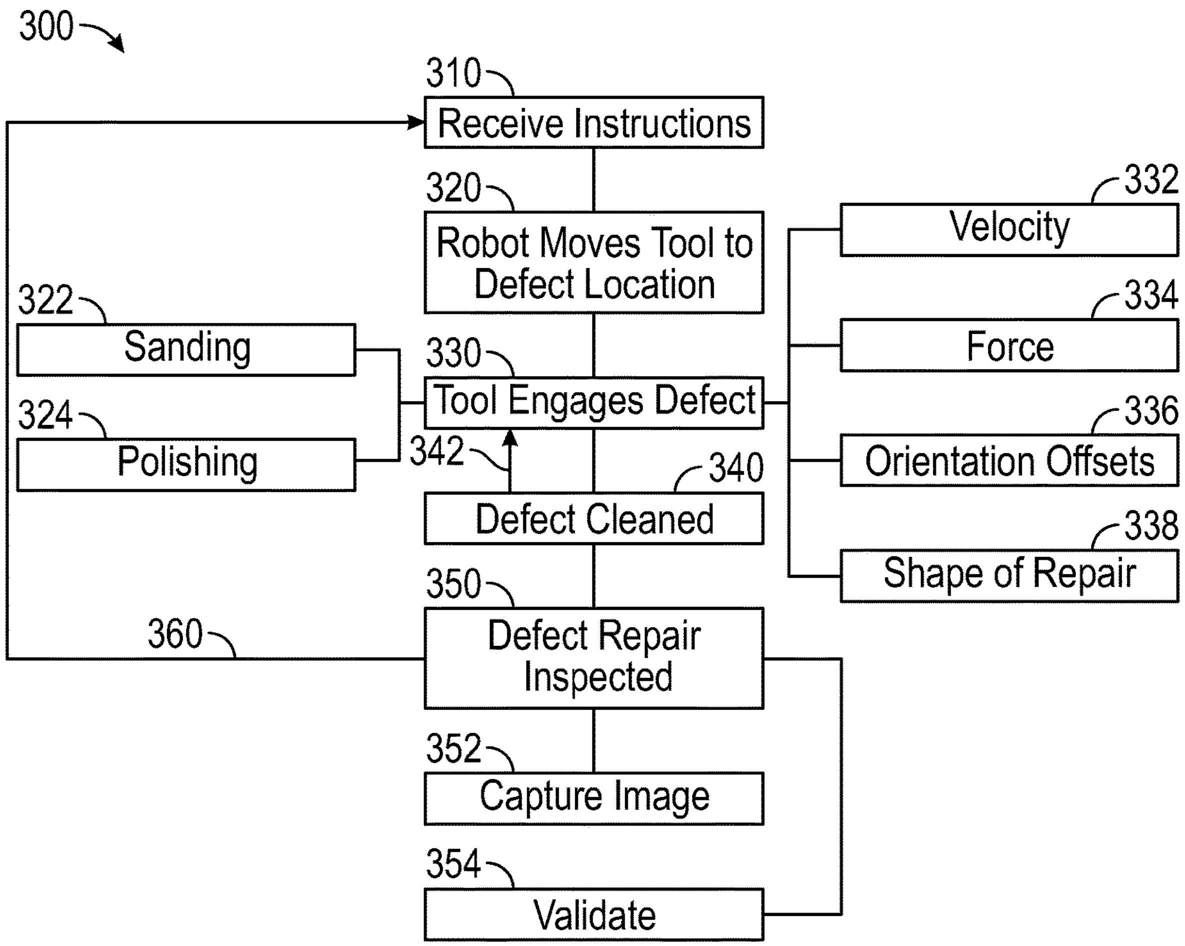
FIG. 3 illustrates a method of robotic defect repair in accordance with an embodiment of the present invention.

FIG. 3 illustrates a method of robotic defect repair in accordance with an embodiment of the present invention. Method 300 is an overview of how a robotic repair system repairs a defect in accordance with at least some embodiments described herein.

In block 310, instructions are received from a robot controller, such as application controller 150 in FIG. 1, for example. The instructions include movement instructions for different components of a robotic repair unit, such as components 210, 220, 230, 240 and 250 of FIG. 2, for example.

In block 320, a robotic motion controller moves an abrasive article, mounted to a tool, in place to prepare to engage a defect. Defect locations on a vehicle are known from an inspection system. Moving the abrasive article into place includes moving the article on top of, or near, the defect. This position may be referred to as the nominal pose of the backup pad.

In block 330, the abrasive article engages the defect. Engaging the defect may include sanding the defect area, as indicated in block 332, or polishing the defect area, as indicated in block 334. Engaging the defect also includes varying different repair parameters of the backup pad, with respect to the nominal pose, such as the velocity 332 of the backup pad, the force 334 imparted to the backup pad, an orientation offset 336 of the backup pad, and an eventual shape of repair 338 created by the sanding and polishing operation.

In block 340, the defect area is cleaned. Cleaning may include wiping away any fluids used in sanding or polishing, as well as wiping away debris. As indicated in block 342, after a cleaning step, the tool may re-engage the defect. For example, a dual mounted tool system may have a sanding unit and a polishing unit available such that, after cleaning is accomplished, the next repair step can be accomplished.

In block 350, the defect area is inspected, to determine whether the repair is sufficient. If additional repair is needed, method 300 may receive new instructions, as indicated by arrow 360, and the method may repeat. Inspecting a defect repair may include capturing post-repair images 352, which may be presented to a repair operator or saved as needed. Inspecting may also include validating the repair, as indicated in block 354, which may include comparing pre- and post-repair images, detecting whether a defect will be visible/noticeable to the human eye, or another suitable validation technique.

Figure 4A:
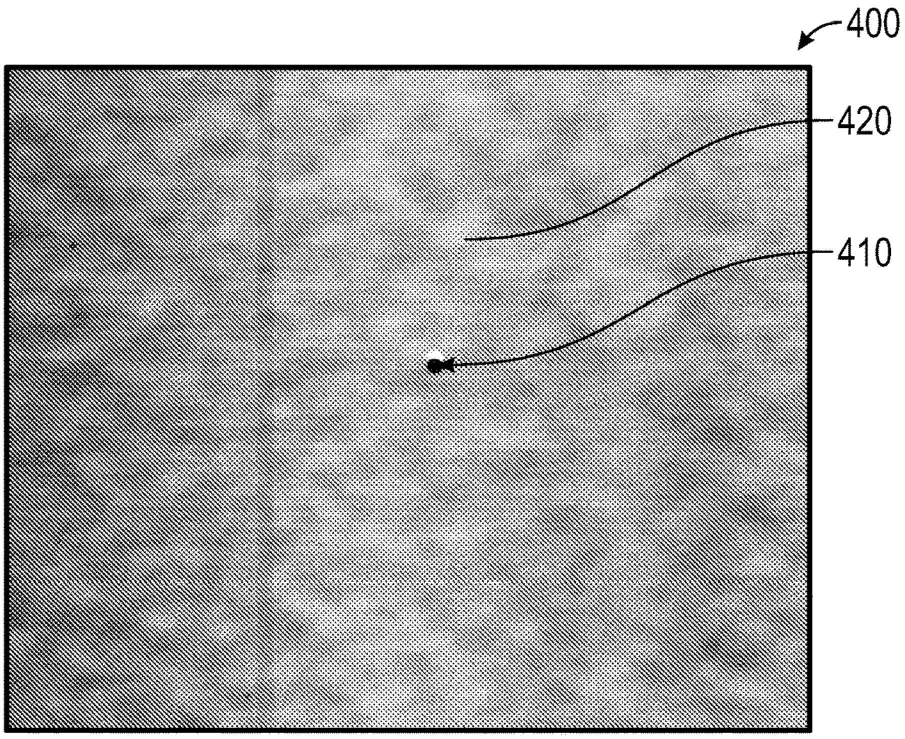
FIGS. 4A-4B are images of defects present that may be on a vehicle.
Figure 4B:
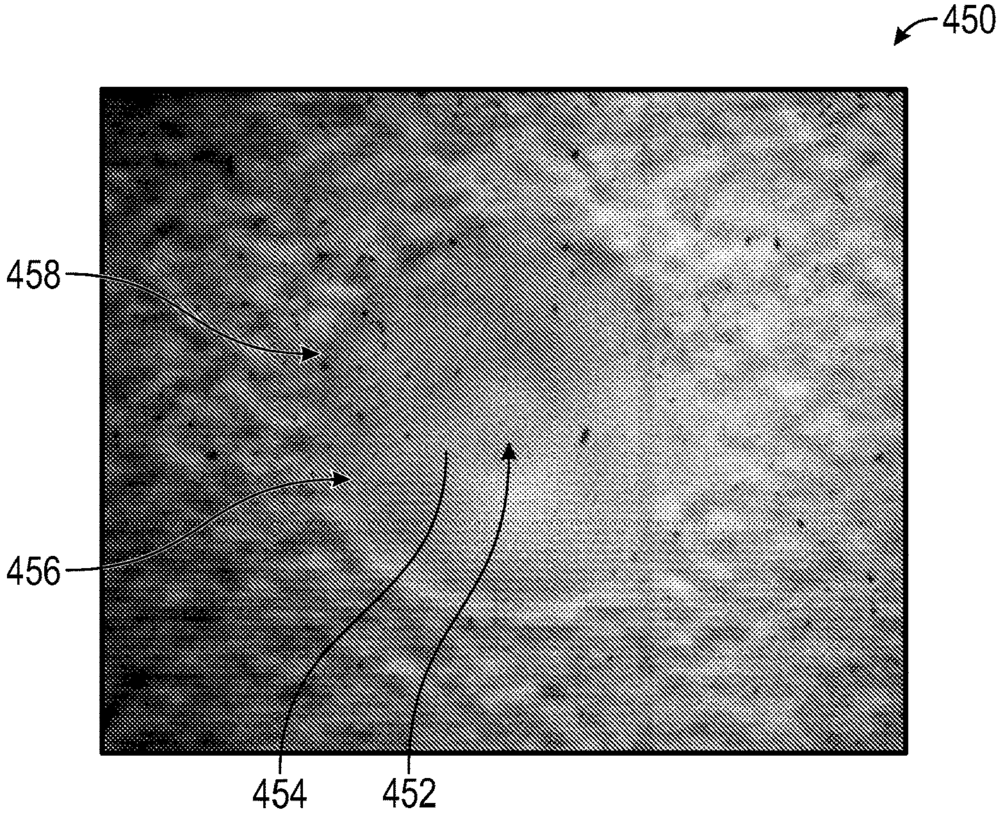

FIGS. 4A-4B are images of defects present that may be on a vehicle. FIG. 4A illustrates a raised defect 410 on a work surface 400. The raised defect 410 is likely caused by debris trapped under one or more layers of paint on work surface 400. Also of note is the texture 420 on work surface 400. When paint is applied to a worksurface in a manufacturing environment, environmental interferences (such as movement or vibration of the vehicle, movement of circulating air, and properties of the paint applied) cause a textured surface 420 that is commonly referred to as "orange peel" because of its appearance. Orange peel can also be added to a clearcoat surface intentionally so that different levels of orange peel texture and add to the aesthetics of different surfaces of a vehicle.

Unfortunately, repair conducted on a worksurface with orange peel will disrupt the texture and can create a highly visible repair area as illustrated in image 450. The repair in FIG. 4B clearly shows a circle outline 458 where an abrasive article contacted the surface. Additionally, an interior circle 454 which is an artifact of the repair strategy. Between a center 452 of the repair area, a wave effect is illustrated because of the force profile, with a surface height decreasing from center 452 to circle 454, rising again to a high point 456 before decreasing again to rim 458. The force profile can be understood as similar in shape to a "Bundt-cake" with a higher pressure applied in an annular ring area within the disc perimeter. The desired repair smoothly blends the polished surface with the orange peel around the edges of the repair to create a feathered result.

In general, it is desired to 'perfectly' repair any defects present in the paint, however, the notion of a perfect repair is largely subjective and thus a formal definition is elusive. Informally, a 'perfect' repair as one in which the end result is visually indistinguishable to the human eye from an otherwise defect-free area of the work surface while the notion of an optimal repair is taken to mean the best repair possible given some starting state. For example, not all defects can be repaired to a perfect state. Additionally, time is a critical parameter for defect repair, as vehicle manufacturing is often an assembly line process. An efficient repair, then, can be characterized as a repair that makes the defect area indistinguishable in as short a time as possible.

The human eye is highly adept at noticing 'perfect' or 'regular' items in nature as well as abrupt transitions in boundary or texture. This sensitivity to abrupt visual boundary transitions necessitates control of transitions between the repaired area and unrepaired area. Repairs such as that illustrated in FIG. 4B are highly visible for a number of reasons including the near-perfect circular nature of repair perimeter 458 as well as the annular center depression 452. In the former case, such transitions are created by the change in surface texture (i.e., from the original paint texture (commonly referred to as orange peel due to its appearance) to the generally more smooth post-polished repaired area) and the latter by height alterations of the surface caused by the distribution of material removal during the repair process. In general, it is not possible to remove the defect without some local alteration to the surface texture and/or height. That said, there is utility in methods that repair sufficiently the defect while leaving as little alteration as possible and furthermore the alterations that are left are such that they are hard for the human eye to notice. In this respect we aim to maximize the concealment of the defect repair on the finished article. As described herein, concealing features are those that decrease the visual apparency of the repair and thus are less likely to be noticed by the human eye. Concealing features may include, for example, feathering around the edges of a boundary, a non-uniform repair area, repair depth profile, non-uniform cut rates, etc.

A cut-modeling-driven approach to deriving repair strategies that aim to reduce the resulting visual appearance of the defect repair while managing boundary transitions is presented. It is important to note that care needs to be taken to not add perceived defects during the repair of the original defect. In some embodiments, a repair strategy starts by identifying desired properties of the cut distribution (i.e., one that sufficiently removes the defect while also exhibiting other desirable concealing characteristics such as blending/feathering) and find the robotic motion that results in said distribution. Such an approach is possible by leveraging predictive cut models of the abrasive/substrate interaction based on first principles and supplemented with measured results. Further discussion is below with respect to FIG. 5.

Methods and systems herein operate under the assumption that the substrates are locally planar. This assumption results in no loss of generality as more sophisticated models that take into account the substrate geometry enable the same approach to be applied to locally non-planar surfaces. Such models are possible and are envisioned in some embodiments herein. In general, the defect can be present in any of the paint layers, at any depth and can assume various forms including: crater, hair, scratch, dust nib, drip, fish eye.

One basis for understanding material removal (and a good first approximation) is the well-known Preston's equation of material removal (Equation 2, below) that expresses the instantaneous rate of material removal (cut) as a product of pressure, relative velocity, and a constant (Preston's constant) defined in part by the complex interaction between the abrasive, substrate, and any cutting fluid.

$$\frac{dh}{dt} = k_p p v_{rel} \quad \text{Equation 2}$$

Here $k_p$ is a constant dependent on the abrasive/surface interaction, p is the pressure at any given point on the surface, and $v_{rel}$ is the relative velocity of the abrasive and the surface at that point. The term dh/dt is the rate at which material is removed. From Equation 2, along with the assumption that the abrasive and any cutting fluid is predetermined and held constant for the duration of a defect repair (i.e., $k_p$ fixed), the domain-specific inputs of instantaneous cut are applied force (and resulting pressure) and tool velocity (rotational, orbital, etc.). Total cut is determined via the integral of instantaneous cut over time distributed accordingly as a function of any macro motion of the end effector by the robot.

In this respect, material removal over a surface can be expressed as an integral of the pressure distribution over the abrasive media (created by interaction with the substrate) scaled by the relative velocities between the abrasive and substrate and Preston's constant. Here we note that the pressure distribution is very much dependent on both the applied force but also the relative posturing of the abrasive/backup pad and the substrate (i.e., it is geometric in nature). Let $$X(t):=[X_p(t), X_o(t)] \quad \text{Equation 3a}$$

be the path of robot repair with components of position ($X_p$) and orientation ($X_o$). Then the cut at some point on the substrate (x) can be expressed as:

$$H(x)=\int_{t=0}^{t_f} k_p p(\tilde{x}(t), X_o(t), t) v(\tilde{x}(t), X_o(t), t), dt \quad \text{Equation 3b}$$

Where x is a point of interest on the substrate in some fixed frame of reference and $\tilde{x}(t)=x-X_p(t)$ is the distance from the tool center point to the point of interest as expressed in a frame centered at the tool center point (where the pressure and velocity distribution is defined from). Equation 3*b* provides the material removed at a point on the substrate x after executing a repair strategy containing a robot motion path (X(t)).

The pressure and relative velocity distribution terms are both functions of the orientation of the tool ($X_o(t)$), as well as functions of time (force can be controlled in time which changes the pressure distribution, velocity can also change in time with orbital and/or rotary tool speed). The output of these distributions are the pressure and velocity at said point of interest (x) at time t. The constant term $k_p$ is adjusted between repairs as the disc life erodes. In our modeling below, we assume this is constant over the life of a single repair. Integrating these terms through time gives the total cut at that point. Thus, the remaining steps are to find and generate appropriate pressure distributions p(x, t) and macro motions of the end effector tooling x(t) depending on the desired outcome. With the aforementioned aim of generating a repair the both sufficiently removes the defect while simultaneously leaving as little visual impact as possible. Creating an irregular boundary between repaired and unrepaired surfaces makes the repair less visible to human inspection.

Figure 5:
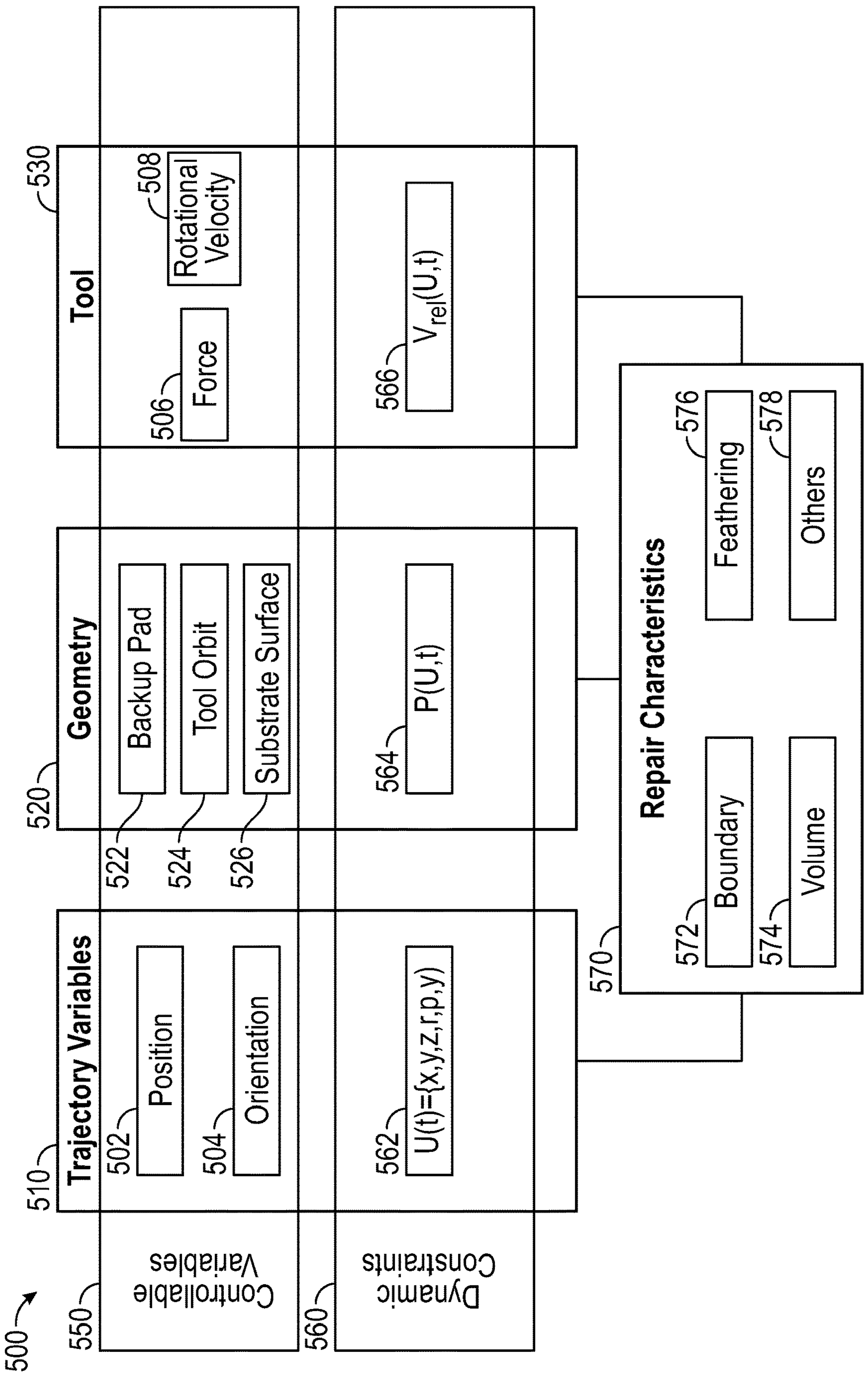
FIG. 5 illustrates variables of interest in a robotic paint repair system.

FIG. 5 illustrates variables of interest in a robotic paint repair system. Variables in system 500 can be manipulated in order to achieve irregularity in a robotic repair. Variables can be broken down generally into controllable variables 550 and dynamic constraints 560. Controllable variables 550 include variables that can be set by a robot controller. Dynamic constraints either result from the controllable variables or are limits set on the robot itself, such as maximum acceleration, velocity or applied force.

Trajectory variables 510 include controllable values of position 502 and orientation 504. A position 502 of a backup pad can be defined in coordinate space (x, y, z). An orientation 504 of a backup pad can be defined by a roll, pitch and yaw (r, p, y). For example, the backup pad may be positioned flush with a work surface or may be tilted by some angle with respect to the workpiece. Trajectory variables can be programmed to adjust during a repair. For example, a backup pad may be moved from a first position ($x_1$, $y_1$, $z_1$) at a first time to a second position ($x_2$, $y_2$, $z_2$) at a second time. Similarly, the orientation (r, p, y) may change from the first point in time to the second point in time. This results in a dynamic pose, U(t), that changes over time. Pose is defined as the relative position and relative orientation of the backup pad to the surface of the team that is abrasive is doing the work against. A pose can position the backup pad in perfect surface alignment with the work surface or a pose can be offset to allow different types of contact with part of the abrasive.

Tool variables 530 are also changeable during a repair. For example, an effective force 506 applied to a backup pad may be changed over time. Additionally, rotational velocity 508 of the backup pad may also change. For example, in the case of a random orbital tool setup performing a circular repair, it may have a first rotational velocity and/or force when moving between 0° and 90° of the circular repair motion, and a second velocity and/or force in the 90° to 360° range of the circular repair motion. In another example, it may have a first velocity for the first two seconds of motion and a second velocity in the last six seconds of motion.

The robot motion combined with the rotational/orbital motion of the tool produce the relative velocity 566 between the abrasive media and the substrate over time. However, we note that in practice, the velocity of the robot (macro motion of the tool) is on a scale that is generally at least an order of magnitude slower than rotational velocity 508 and is, therefore, generally negligible when computing instantaneous cut in the presence of a powered tool. If necessary, however, the dynamic pose U(t) can be accounted for. Combining controlled force 506 and trajectory variables 510 also results in a dynamic pressure 564 over time due to the abrasive/backup pad interaction.

Tool variables, in reality, cannot change instantaneously and are bounded by dynamic constraints. Therefore, any trajectory variables 510 and tool variables 530 must take into account dynamic constraints of the tool and the robot.

While trajectory variables 510 and tool variables 530 can be adjusted during a repair, geometry variables 520 are generally only exchanged in between repairs. For example, a backup pad 522 has a given diameter that remains constant during a repair. Similarly, the orbit 524 of a tool connected to backup pad 522 is also set before a repair and is generally only changed in between repairs. The substrate surface 526 is also limited in that it is a function of the defect's location on the vehicle's body. Geometry variables 520 also contribute to experienced pressure 564 over time.

Together, trajectory variables 510, geometry variables 520 and tool variables 530 all result in a set of repair characteristics 570 for a given repair. In some embodiments, it is desired that at least one repair characteristic 570 contribute in some form to the concealment of the repair. In some embodiments, multiple characteristics 570 contribute in some for to the concealment of the repair.

A repair boundary 572 refers generally to the perimeter of a repair. Many current robotic repairs are circular, as illustrated in FIG. 4B. In other words, they have a constant radius extending out from the center of the repair. In contrast, a non-circular boundary 572 refers to a boundary that has some non-constant radius. Non-circular boundaries are one form of concealment as they are generally less noticeable in many scenarios. Some examples include rotationally symmetric (periodic) shapes such as ellipsoids, stars, etc.; a-periodic and/or stochastic shapes with no symmetry (rotational, radial, bilateral, or otherwise); and arbitrary (open) curves in general.

In particular we leverage rotational symmetry. Rotational symmetry of order n (i.e., n-fold rotational symmetry with respect to an origin or axis means that rotation by an angle of 360°/n (30°, 60°, 90°, 120°, 180°, etc.) does not change the repair pattern. A "1-fold" symmetry is not considered symmetric by this definition as a rotation of 360° effectively does not rotate the shape. Some examples include ellipses and lemniscates (2-fold), squares (4-fold), some petaled curves, etc. A circle is effectively infinity-fold (i.e., any rotation results in the same shape).

A repair volume 574 refers to the volume of work surface (i.e., substrate material) removed. In general, this can be specified as a total volume or more usefully the volumetric distribution of removed material (i.e., cut depth as a function of substrate position). The above examples of concealment features extend naturally from the repair boundary case above to the repair volume distribution such as symmetry, etc. Additionally, we consider the profile of cut over some region of interest. For example, the cut depth as a function of distance from the center of repair or defect location. Here forms of concealment can be expressed as mathematical function properties such as monotonicity, convexity, etc.

One example of a volumetric concealment strategy is feathering 576 which involves gradually decreasing the cut depth with distance from the defect. Feathering 576, or blending, refers to techniques that cause the outer edge, or boundary, of a repair to be less visible and 'blend' into the orange peel. Some examples of feathering are illustrated in FIGS. 19-23.

Other (concealment) characteristics 578 of the repair may also be introduced by varying the different controllable variables 550.

Regarding pressure distribution, closed cell foam can be approximated as a spring-damper of a single backup pad. For example, if we assume that the backup pad is made of foam and compression (displacement) kept relatively low, we can assume a fixed pressure distribution curve for each pad configuration and model the pressure distribution as described in FIG. 6 below.

Figure 6A:
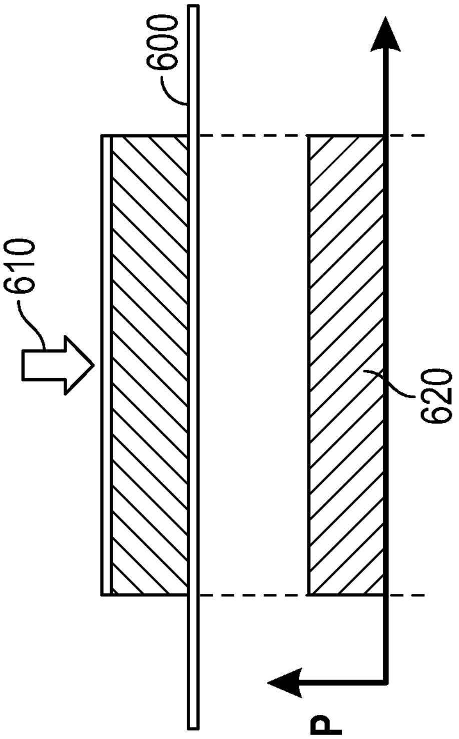
FIGS. 6A-6D illustrates example pressure responses that may be utilized in embodiments of the present invention.
Figure 6B:
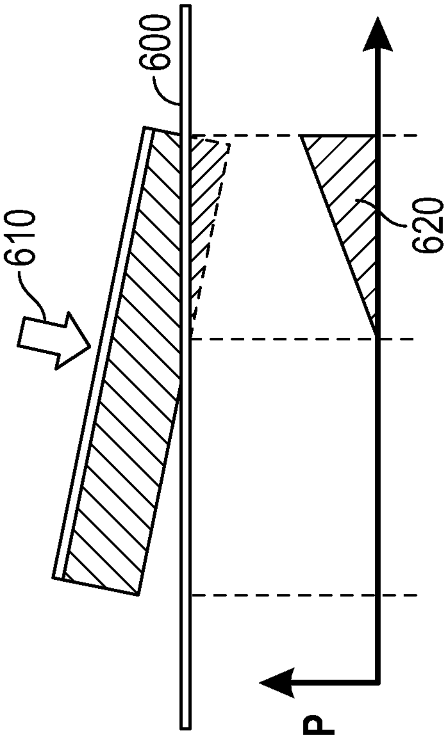
Figure 6C:
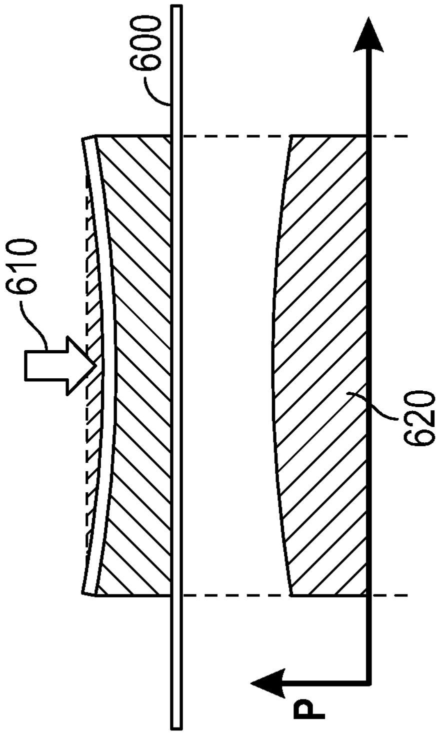
Figure 6D:
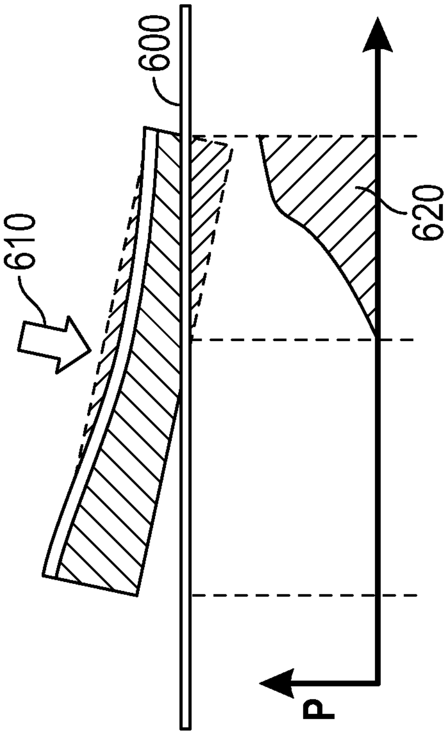

FIGS. 6A-6F illustrates example pressure responses that may be utilized in embodiments of the present invention. FIGS. 6A-6D all illustrate how a tool 610 (such as a backup pad) may interact with a work surface 600, and the resulting experienced pressure 620 along a cross-section of the backup pad. Schematic pressure distributions demonstrating various backup pad and substrate interface configurations are illustrated for both rigid supports (6A) and deformable (6C). In the top images, the backup pads are aligned planar with the substrate while FIGS. 6B and 6D are tilted by some non-zero offset. For all cases, force is applied normal to the backup pad support. The example of FIG. 6B can be modeled with Equations 4 and 5 below.

$$p(u, v) = \begin{cases} 0, & \sqrt{u^2 + v^2} > r_{disc} \\ \max(0, mu + b), & \sqrt{u^2 + v^2} \le r_{disc} \end{cases} \qquad \text{Equation 4}$$

Where u and v represent coordinate locations as expressed in a frame of reference positioned at the abrasive center point, and oriented with u pointing along the surface, in the direction of tilt.

Satisfying:

$$\iint p(u, v)\,du\,dv = f_{tool} \qquad \text{Equation 5}$$

Figure 7A:
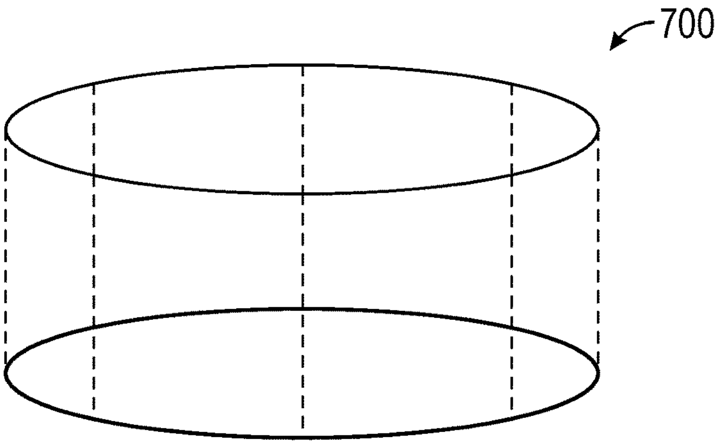
FIGS. 7A-7C illustrate example orientations that may be useful in embodiments of the present invention.
Figure 7B:
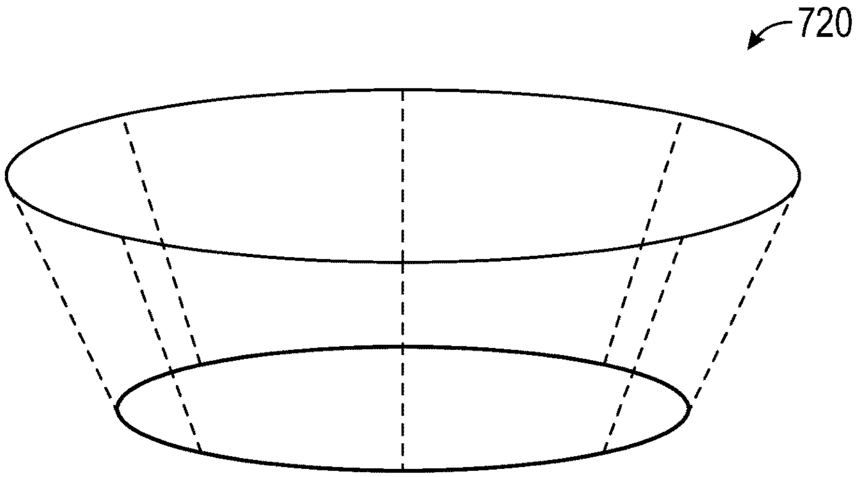
Figure 7C:
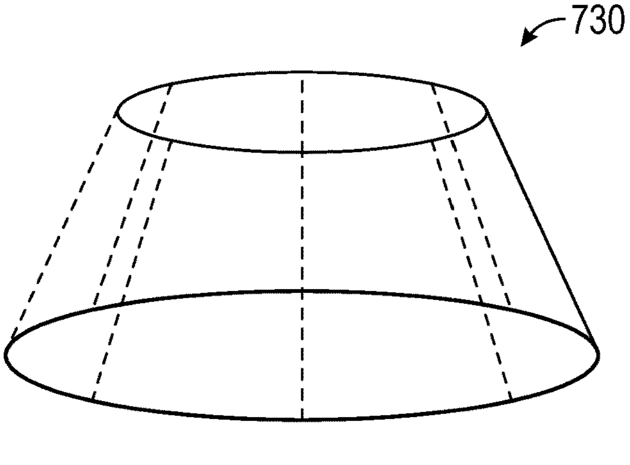

FIGS. 7A-7C illustrate example orientations that may be useful in embodiments of the present invention. As illustrated in FIGS. 6A-6E, a backup pad may be at an angle with respect to a worksurface. FIGS. 7A-7C illustrate different tilts that a backup pad may have with respect to a surface. FIG. 7A illustrates a normal tilt 700, where a backup pad is flush with a worksurface. FIG. 7B illustrates an outward tilt 720 and FIG. 7C illustrates an inward tilt 730. However, while each of tilts 700, 720 and 730 are illustrated as constant for an entire rotation of a circle, it is expressly contemplated that an orientation of the backup pad can change within a given rotation, introducing a desired irregularity into the repair.

Figure 8:
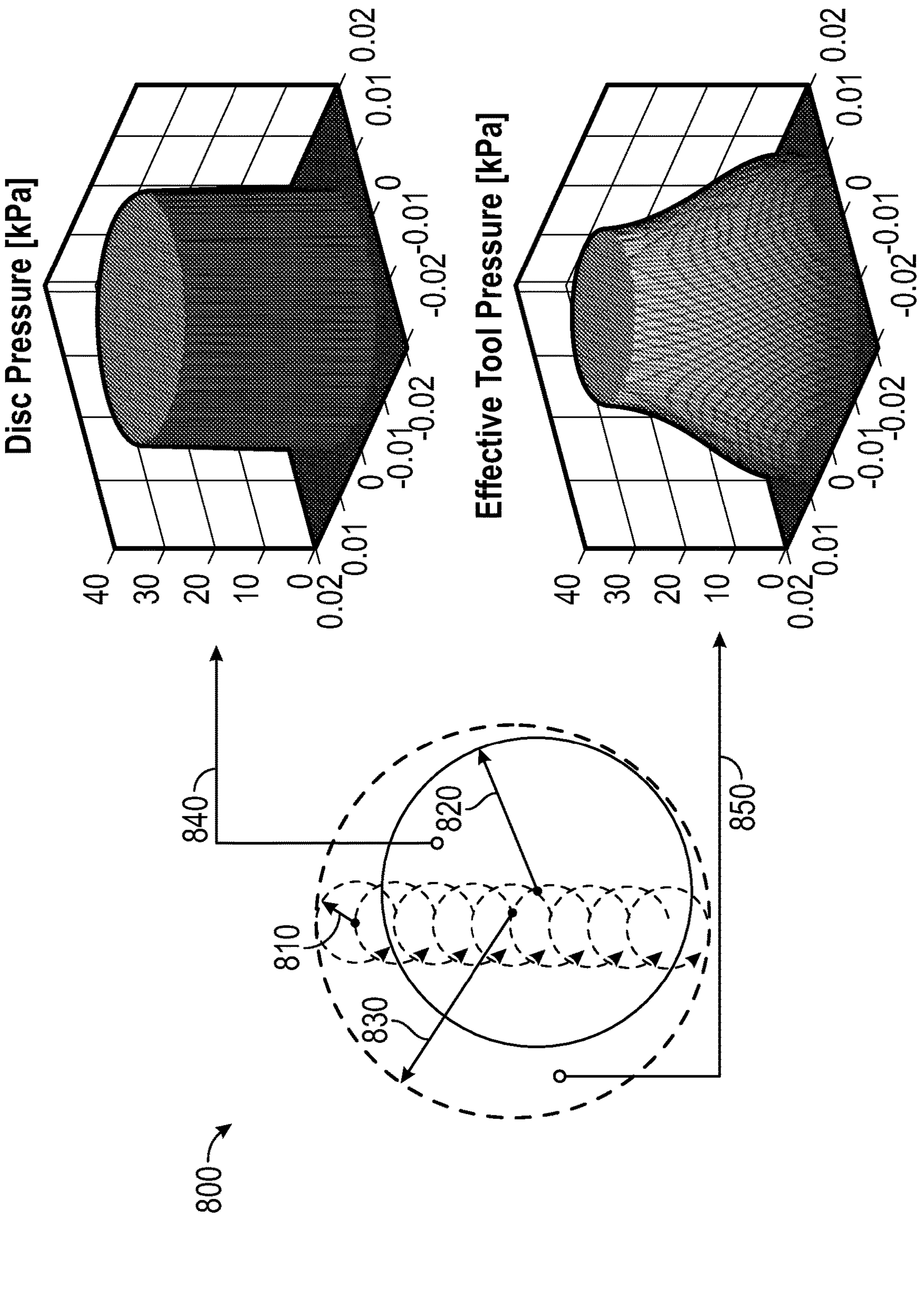
FIG. 8 illustrates pressure profiles of an orbital sander.

FIG. 8 illustrates pressure profiles of an orbital sander. Several different tools can be used for an abrasive operation including vibratory, rotary, orbital and random orbital sanders. An orbital sander moves in a circular motion, as illustrated in FIG. 8. A random orbital sander also includes a passive rotation of the backup pad. Because of the extra random rotation, a random orbital sander may leave less of a swirl pattern on a surface. FIG. 8 illustrates motion of an orbital sander for ease of understanding, however random orbital sanders are expressly contemplated herein as providing an additional variable in the passive rotational velocity of the backup pad.

FIG. 8 also illustrates how an effective tool pressure distribution can be modeled for use in Equations 3a and 3b above. Effective pressure resulting from tool motion taken as a time average of backup pad pressure distribution over the tool's range of motion. For this example, the backup pad pressure distribution is shown at the top right and the effective tool pressure distribution on the lower right for a (random) orbital tool with an orbit radius of one third the backup pad radius.

FIG. 8 illustrates motion of an orbital sander 800, with a given disc pressure 840 and the resulting disc pressure 850. Orbital sander 800 has a known orbit radius 810, a backup pad radius 820, and a resulting effective radius 830 of the affected workspace area. This results in an effective disc pressure that is higher in the center of a larger affected area, and a lower effective disc pressure near the edges. The effective disc pressure can be manipulated over an entire repair area to introduce concealing features into repair characteristics. Higher pressure correlates to higher material removed. Moving an orbital sander over a repair surface can introduce both concealing volumetric features and concealing boundary features to a repair.

Figure 9A:
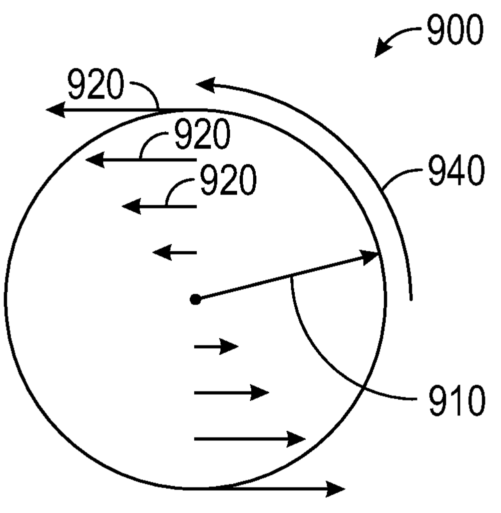
FIGS. 9A-9B illustrate velocity profiles of rotary and orbital sanders.
Figure 9B:
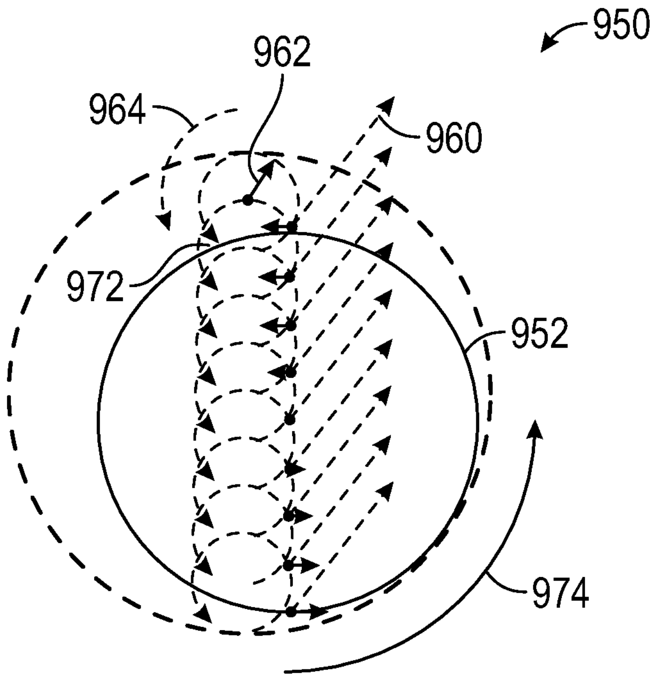

FIGS. 9A-9B illustrate velocity profiles of rotary and orbital sanders. Schematic representation of abrasive feature velocities for rotary and orbital setups are illustrated in FIGS. 9A and 9B, respectively. Velocities vectors are depicted by arrows 920 and 960, respectively. A rotary sanding unit has a radius 910 and is configured to rotate in a direction 940, resulting in a velocity profile as indicated by arrows 920. The outer edges of a rotary sander 900 have a higher velocity than an interior of the rotary sander.

Orbital sander 950 has a tool area 952, which is smaller than an effective tool area 972. The orbital sander 950 has an orbit radius 962 and rotates in direction 964, resulting velocities 960. Orbital sander 950 rotates in direction 974.

A robotic repair unit can have knowledge of what abrasive tools, as well as what abrasive material grade is present on a tool for a given repair. Additionally, in some embodiments, the robotic repair unit also has an indication of a remaining life, or abrasive effectiveness, of an abrasive disc. Knowing details about the abrasive material, and what kind of tool is coupled to the robotic arm, allows for even more control over a final repair. While two types of abrasive tools are illustrated in FIGS. 9A and 9B, other abrasive tools are also known and envisioned for at least some embodiments.

Figure 10A:
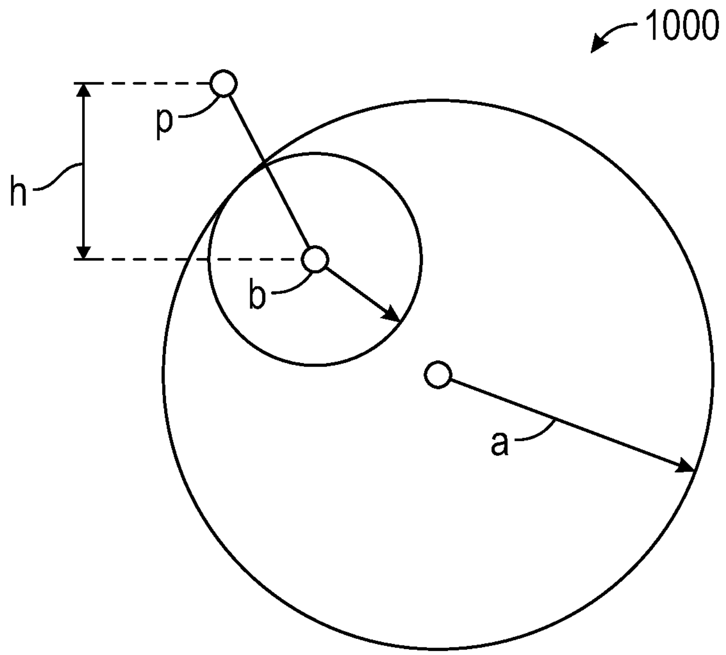
FIGS. 10A-10C illustrate shapes that may serve as the basis for a robotic repair trajectory in embodiments of the present invention.
Figure 10B:
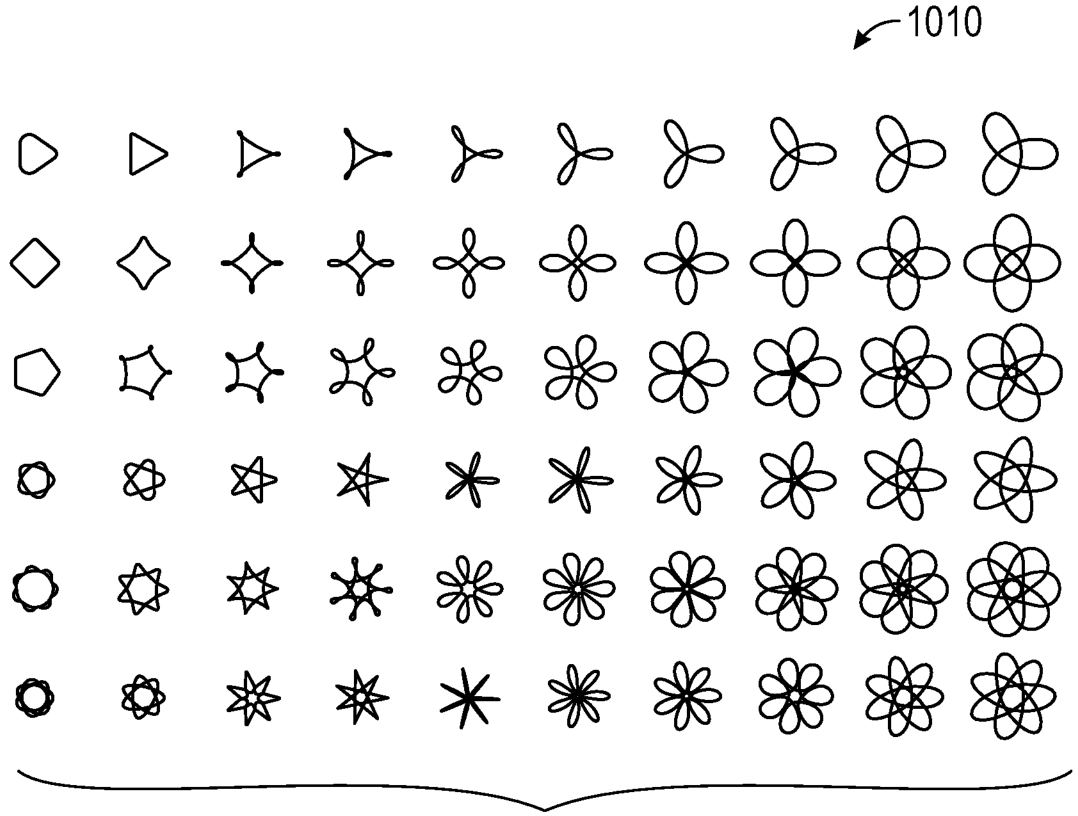
Figure 10C:
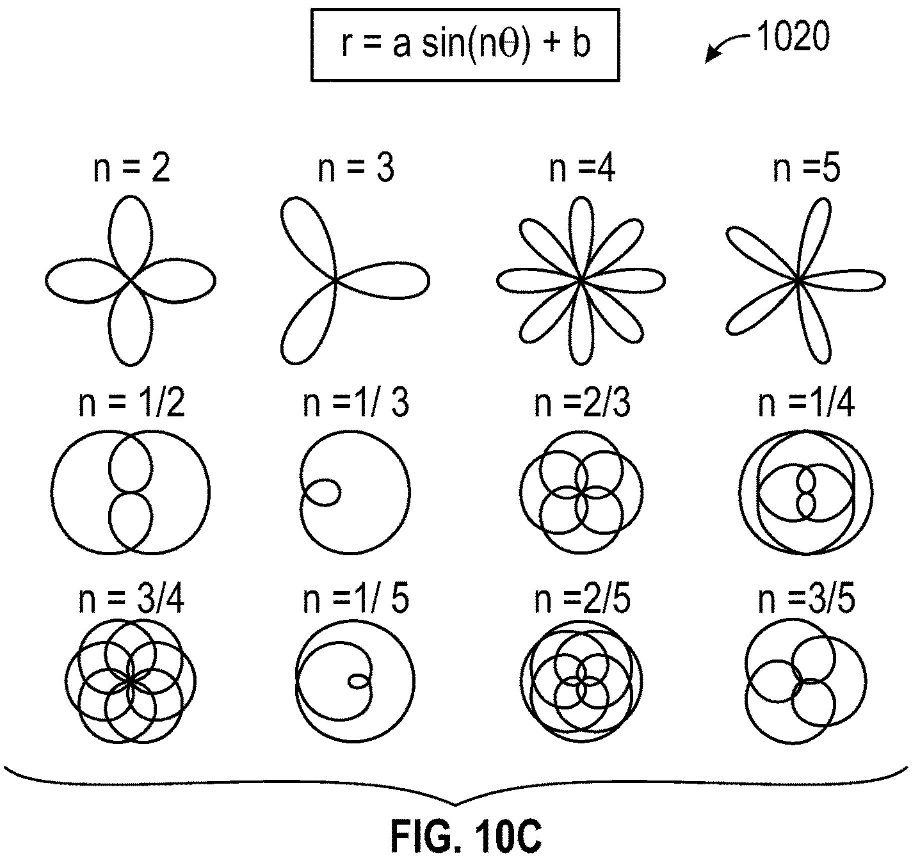

FIGS. 10A-10C illustrate shapes that may serve as the basis for a robotic repair trajectory in embodiments of the present invention. Many current robotic repair units rely on circles for generating repairs, often rotating an abrasive disc around a single point to remove a defect. As described above, and as illustrated in FIG. 4B, this results in a repair that is 'too regular' and noticeable to the human eye. Other shapes and designs have been explored to determine what other designs can be affected by a robotic repair unit without resulting in a circular repair area.

For example, the following curves may be useful in creating sufficiently non-regular and thus concealing repair features: bean curves, butterfly curves, eight curves, ellipses, foliums (bifolium, trifolium, quadrifolium, etc.), heart curves, hippopedes, lemniscates, neoids, spirals (Archimedean, Cotes', Fermat's, hyperbolic, etc.), superellipses, roulettes (epitrochoid, hypotrochoid, epicycloid, hypocycloid, etc.), logarithmic, and roses amongst others.

One family of shapes of particular interest are the roulettes of hypotrochoids and epitrochoids, which can be formed by a robotic repair unit following Equations 7 and 8 below, using the variables as illustrated in diagram 1000 of FIG. 10A. Some example shapes obtained in this manner are illustrated in table 1010 of FIG. 10B.

$$x = (a-b)\cos\theta + h\cos\left(\frac{a-b}{b}\theta\right) \quad \text{Equation 7}$$

$$y = (a-b)\sin\theta - h\sin\left(\frac{a-b}{b}\theta\right) \quad \text{Equation 8}$$

FIG. 10C illustrates another set of shapes, referred to herein as "rose" shapes 1020. Rose shapes 1020 can be obtained using Equation 9 below:

$$r = a\sin(n\,\theta) + b \quad \text{Equation 9}$$

General rose shapes 1020 are each illustrated with the associated n value. Coefficients (a,b) can be used to stretch or dilate the shape, respectively.

It is noted that roses, along with circles, limacons, and epi/hypocycloids are special cases of epitrochoids and/or hypotrochoids (i.e., expressible via careful selection of a, b, and h).

Figure 11A:
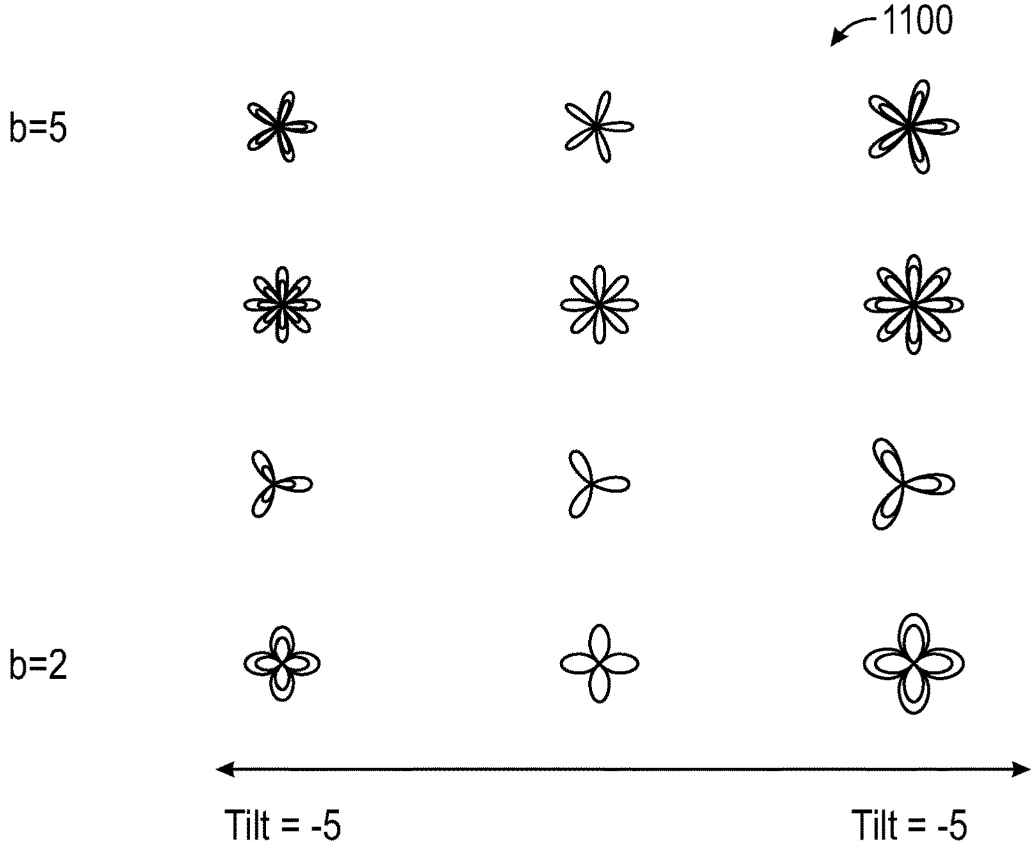
FIGS. 11A-11B illustrate orientation and force profiles for trajectories in accordance with embodiments of the present invention.
Figure 11B:
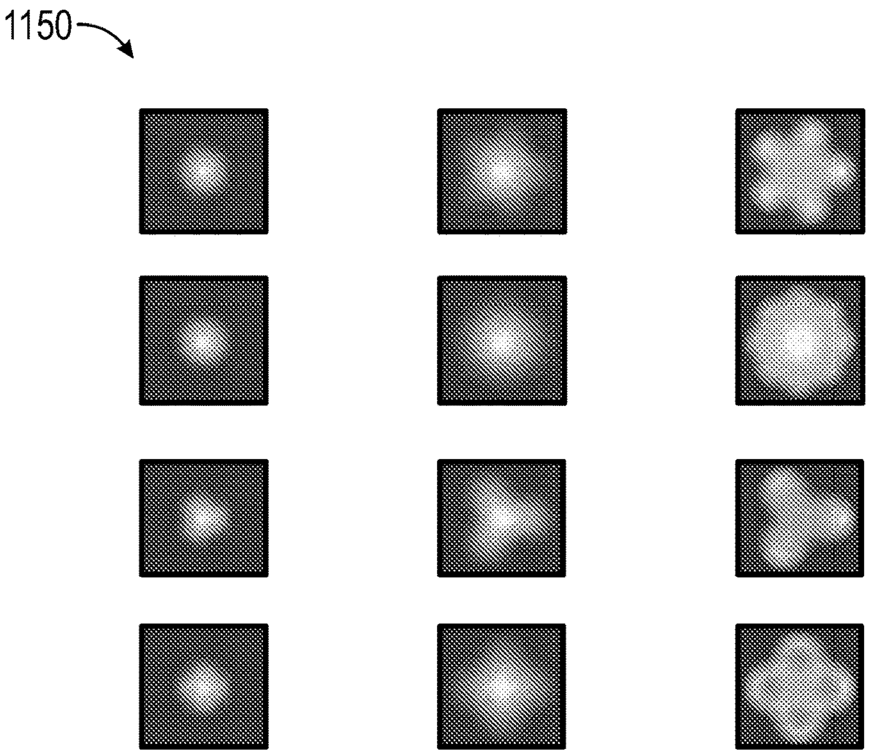

FIGS. 11A-11B illustrate repair trajectories and resulting material removal (cut) distributions in accordance with embodiments of the present invention. Combining shapes and a tilt of the backup pad can result in very different material removal profiles, as illustrated in the comparison between table 1100 and table 1150. Each shape in table 1100 corresponds to a rose with an n value of 2, 3, 4 or 5, and a tilt of −5°, 0° or 5°. The resulting material removal profiles are illustrated in FIG. 11B. As illustrated in FIG. 11B, rose-based (and thus epi/hypotrochoid) trajectories are able to concentrate abrasive removal on a defect area while also varying a removed volume over the repair area. This results in better blending of the repair into the surrounding orange peel on a worksurface via irregularity.

Such trajectories offer significant concealment flexibility. As an example, cut distribution 1152 of FIG. 11B demonstrates defect modification (in an area less that the diameter of the backup pad) and smooth transition between the defect modification and surrounding area. Cut distribution 1154 of FIG. 11B shows a "Bundt cake" shaped repair that exhibits smooth feathering and non-circular, rotational symmetry (8-fold rotational symmetry in this case) as concealing features.

Figure 12:
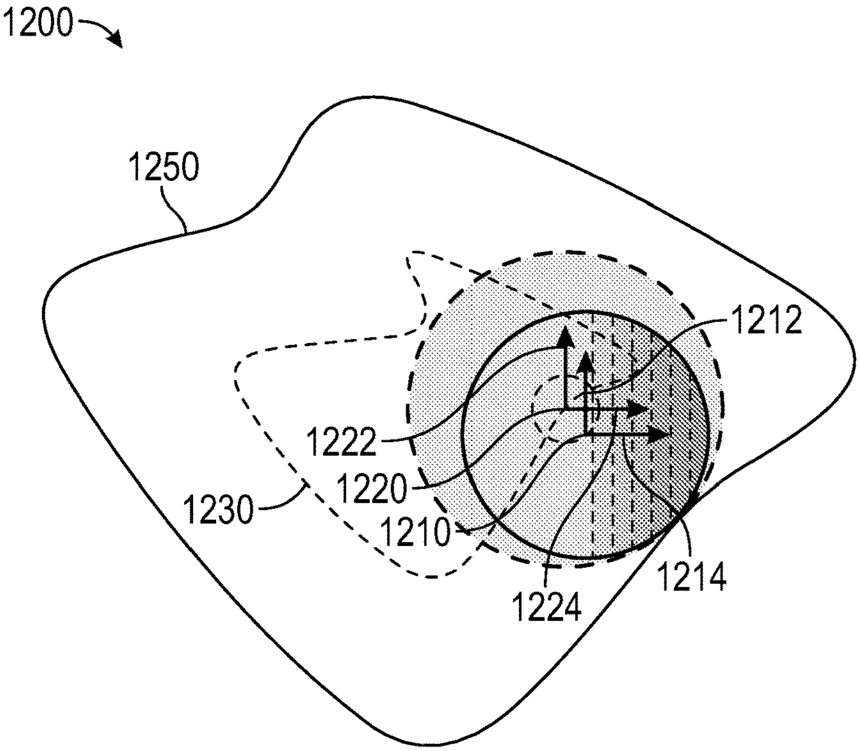
FIG. 12 illustrates a diagram of a repaired work surface in accordance with embodiments described herein.

FIG. 12 illustrates a diagram of a repaired work surface in accordance with embodiments described herein. Work surface 1200 has an orange peel texture that a sanded region 1250 attempts to blend into. An abrasive disc, attached to a backup pad, has a center 120 and can move along worksurface 1200 as indicated by directions 1212 and 1214. In the embodiment illustrated in FIG. 12, the backup pad is attached to a random orbital sander which can also move in directions indicated by arrows 1222 and 1224.

A repair trajectory 1230 is illustrated as having an irregular shape that does not correspond to a regular polygon. Repair trajectory 1230 has multiple curves and convex indentations that result in a repair region 1250 with an irregular perimeter. FIG. 12 illustrates a backup pad with a tilted orientation, resulting in an applied pressure gradient across the area of worksurface 1200 contacting the backup pad at a given time. This results in irregularities in the volume removed within repair region as well.

Figure 13:
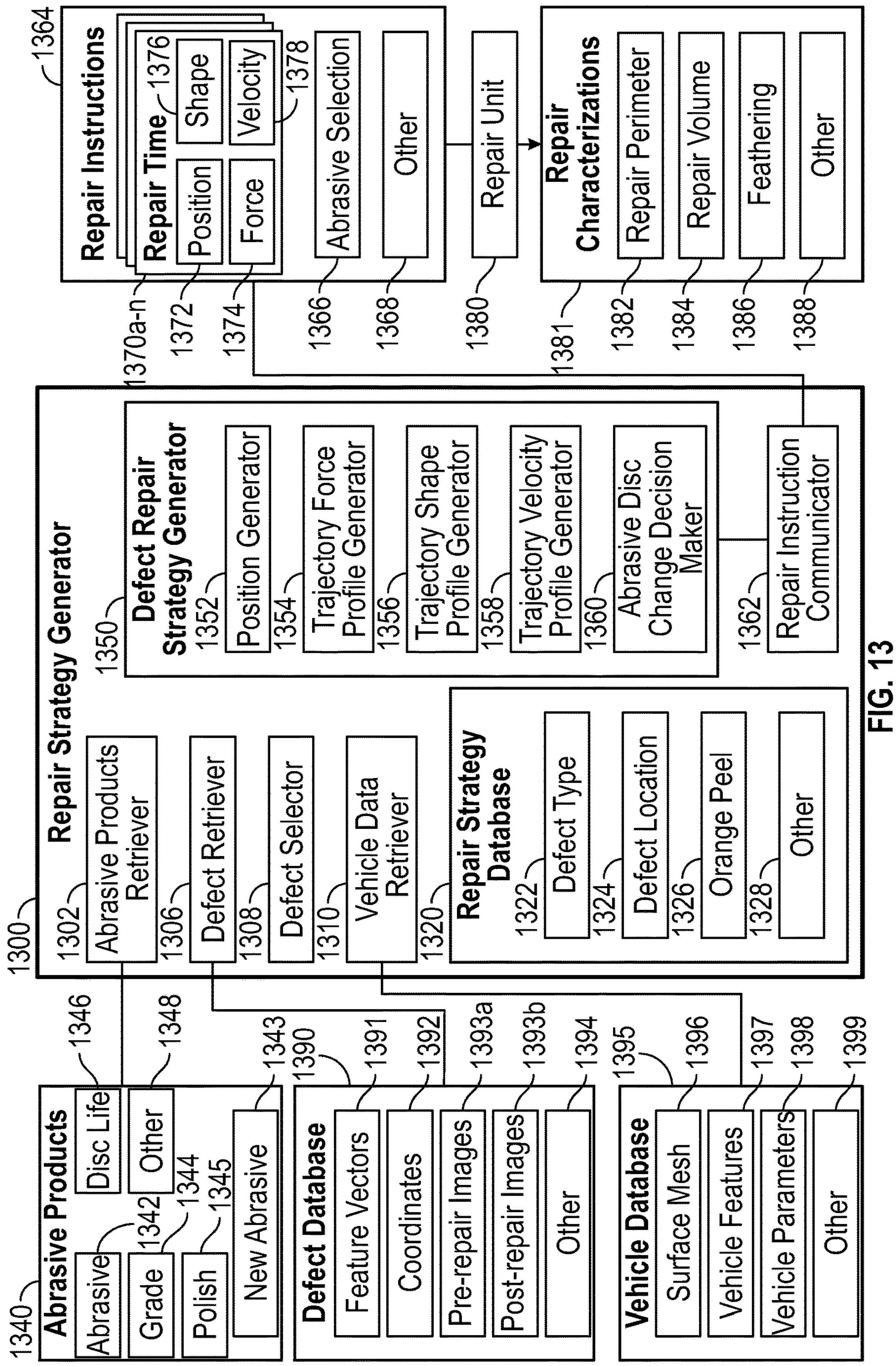
FIG. 13 illustrates a repair strategy generation system in accordance with embodiments described herein.

FIG. 13 illustrates a repair strategy generation system in accordance with embodiments described herein. Repair strategy generator 1300 receives information from one or more data sources and, based on the received information about a defect present on a vehicle, generates a repair strategy for the defect. The repair strategy targets adequate removal of the defect and sufficient blending of the repair surface with the orange peel texture of the vehicle so that visibility and detectability by the human eye is reduced.

Repair strategy generator 1300 has an abrasive product retriever 1302 that communicates with an abrasive products database 1340. Abrasive products database 1340 includes, in one embodiment, information about a current abrasive product 1342 on an active repair system. The abrasive article 1342 has a grade 1344 and other characteristics 1348, such as size. In some embodiments, abrasive products database may also have disc life information 1346 about the abrasive article 1342. Abrasive product retriever 1302 may retrieve all of this information about a current abrasive 1342, as well as a potential new abrasive product 1343 that could be exchanged for the current abrasive product 1342.

Repair strategy generator 1300 also includes a defect retriever 1306. Defect retriever 1306 communicates with a defect database 1390. Defect database 1390 includes information about defects on a vehicle, including defects being evaluated by repair strategy generator 1300. A given defect may have one or more feature vectors 1391 the compactly describe the defect's characteristics via real numbers and/or classifications, and may have a coordinate location 1392 on the vehicle. Defect database 1390 may also have pre-repair images 1393 of the defect, taken by a vision system, for example. Defect database 1390 may have other information 1394 about a defect of interest as well as information about other defects, for example similar defects, repair trajectories used in repairing the similar defects, and evaluation of those repairs.

Defect selector 1308 selects a defect, or a series of defects, to be repaired by a repair system. Not all defects require repair. For example, if a defect is on a surface of a vehicle that is not seen by a prospective customer, it may not need to be repaired. Defect selector 1308 selects each defect that requires repair in order for defect repair strategy generator 1350 to generate repair instructions. In one embodiment, repair instructions are generated one at a time for a plurality of defects and send each repair instruction to a repair robot individually. In another embodiment, defect repair strategy generator 1350 generates a single trajectory that addresses each of the identified defects for repair.

Repair strategy generator also communicates with a vehicle database 1395 using a vehicle data retriever 1310. Vehicle data retriever 1310 retrieves information about a vehicle undergoing inspection and repair. The vehicle has a surface mesh 1396 that includes a discrete representation of the geometry of the surface of the vehicle. The vehicle may also include one or more features 1397, including a make, model, color, paint layers and treatment number of doors, detailing, or other modifications. The vehicle may also have one or more parameters 1398, including orange peel presence and texture on the surface. Vehicle database may also store other information 1399.

Repair strategy database 1320 includes information that may be helpful in evaluating a defect and generating a strategy for repair. Repair strategy database 1320 includes information about a defect including defect type 1322 and location 1324. Repair strategy database 1320 also includes information about orange peel 1326 present in the vicinity of the defect to be repaired. Repair strategy database 1320 may also include other information, including a defect area on the vehicle worksurface.

Defect repair strategy generator 1350 receives information retrieved by abrasive product retriever 1302, defect retriever 1306, defect selector 1308, vehicle data retriever 1310, and repair strategy database 1320 to generate a repair instruction 1364 that will be communicated to a robotic repair unit.

Repair instructions 1364 include a shape 1376 that a robotic end effector will make during a repair. The shape 1376 may be a stationary point, such that the tool remains stationary during a repair. In another embodiment, shape 1376 includes moving the end effector such that the backup pad, and an abrasive product, is dragged across the vehicle worksurface in a shape. The shape 1376 may include a circle with a radius larger than the radius of the backup pad, in one embodiment. The shape 1376 may include an ellipse, in another embodiment. Shape 1376 may also include a rose, an epitrochoid, a hypotrochoid, or another polygon such as a rectangle, square, in other embodiments. Shape 1376 may also include an irregular shape, in some embodiments, such as one with curved or straight edges, concave or convex portions, or other features.

Defect repair strategy generator 1350 includes a position generator 1352, which generates a starting position of an abrasive tool for the repair trajectory. The generated starting position may be the same as an ending position of the generated trajectory, or it may be different.

Defect repair strategy generator 1350 also includes a trajectory force profile generator 1354, which generates a force 1374 to be applied to a backup pad at each point along the trajectory. Force 1374 may be evenly applied at each point in time during a repair trajectory, in some embodiments. Force 1374 may be evenly applied across a backup pad during a repair trajectory, in some embodiments. In other embodiments, force 1374 is different at different times 1370 during a repair, for example a force may initially be higher, at a repair time 1370*a*, than at a later time 1370*b* in the repair. Additionally, an end effector may tilt a backup pad so that a gradient force 1374 is applied for at least a portion of a repair. The gradient force 1374 may change during a repair such that a tilt is different at a time 1370*a* than at a time 1370*b*.

Defect repair strategy generator 1350 also includes a trajectory velocity profile generator 1358. Trajectory velocity profile generator 1358 generates a velocity 1378 at which backup pad moves at each point in repair time 1370*a-n*. For example, in a circle shaped trajectory, an end effector may cause a backup pad to move more quickly during a first portion of a rotation than a second portion of a rotation.

Defect repair strategy generator 1350, in some embodiments, also includes an abrasive disc change decision maker 1360. In some embodiments, repair instructions 1364 may also include instructions for a repair robot to change out an abrasive disc, or a backup pad, before the next defect repair begins. Disc change decision maker 1360 determines whether to change out a disc, in one embodiment, based on a disc life indication 1346. Disc life indication 1346 may be a measure of abrasive material remaining on an abrasive disc, for example, or may be based on a number of repair cycles completed with a given abrasive article.

Repair instructions 1376 are sent to a repair unit 1380 by a repair instruction communicator 1362. Repair instruction communicator 1362 may communicate with repair unit 1380 using a wired connection or a wireless connection. In some embodiments, repair strategy generator 1300 is part of repair unit 1380, such that repair instruction communicator 1362 communicates instructions directly to a force controller and end effector, which implement the repair.

Repair instructions 1364 include, for a series of time points 1370*a-n*, a position 1372 of a backup pad on the work surface, within a shape 1376 of the repair trajectory, a force 1374 to be implemented by a force controller, and a velocity 1378 of the abrasive tool.

After repair unit 1380 completes a repair, in some embodiments, repair characteristics 1381 are collected. Some repair characteristics, such as a perimeter 1382 and volume 1384, may be anticipated based on the repair strategy generated by defect repair strategy generator 1350, and validated as part of collecting repair characteristics 1381. Repair characteristics may also include a degree of feathering 1386. For example, feathering 1386 should be present along the perimeter of the repair area. In some embodiments, feathering 1386 is roughly even across the perimeter. Other repair characterizations 1388 may also be captured, including post-repair imaging, in some embodiments.

Figure 14:
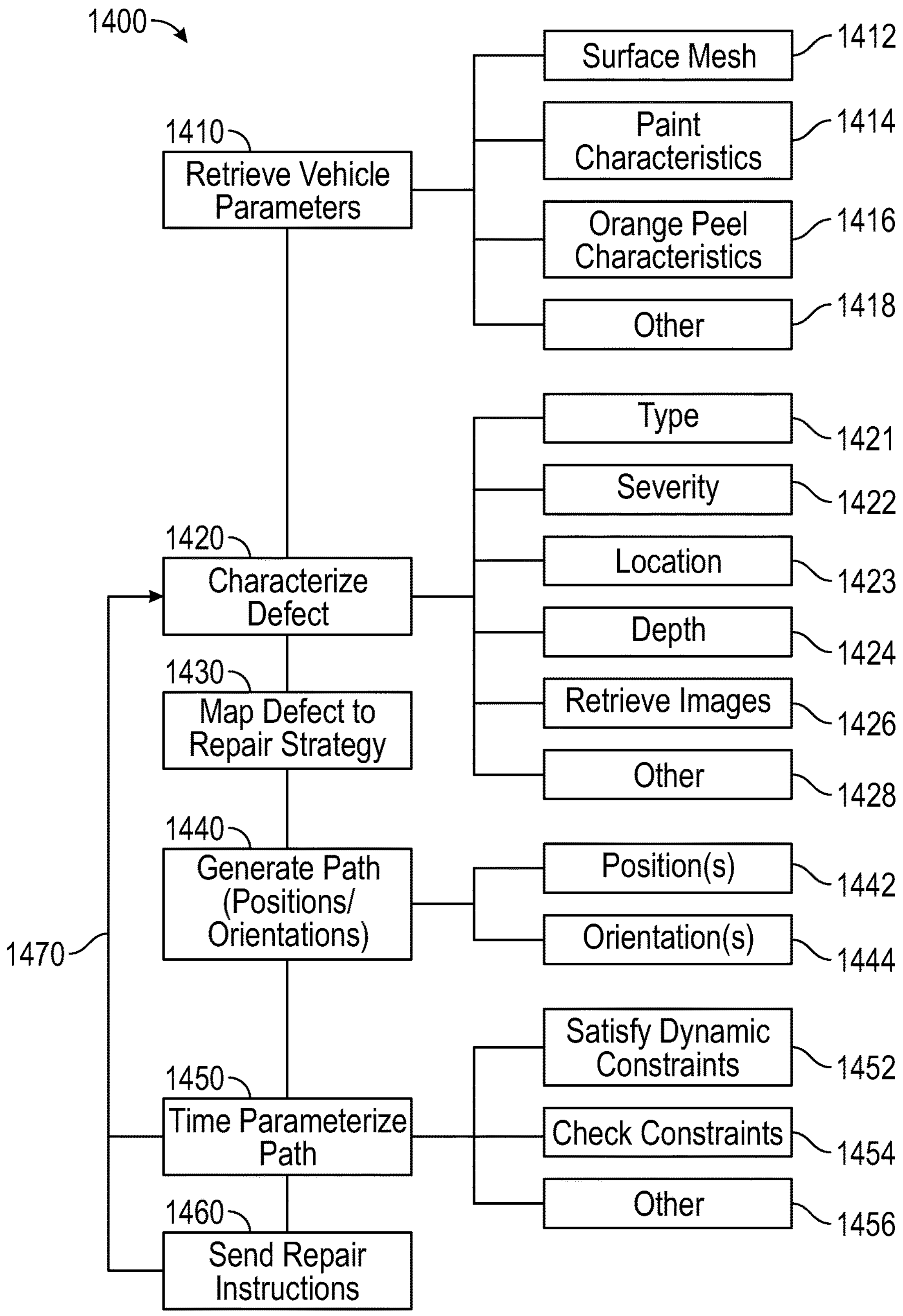
FIG. 14 illustrates a method of generating repair instructions in an embodiment of the present invention.

FIG. 14 illustrates a method of generating repair instructions in an embodiment of the present invention. Method 1400 may be implemented in one of the systems described in embodiments herein, or in another suitable system.

In block 1410, vehicle parameters are retrieved. Vehicle parameters concern a vehicle ready to undergo a repair. The vehicle may have an associated surface mesh 1412. Retrieving vehicle parameters may also include retrieving characteristics about paint applied to the vehicle, including layers, amounts, curing conditions and hardness, as indicated in block 1414. Orange peel characteristics 1416 may also be retrieved, for the entire vehicle or for a localized portion surrounding one or more defects on the vehicle.

In block 1420, a defect is characterized. A vehicle may have multiple defects, at least some of which are characterized for repair, in some embodiments. Characterizing a defect may include a defect type 1421, a defect severity 1422, or a location 1423 on a vehicle. For example, a defect type 1421 may include a smudge or a scratch. A defect severity 1422 may refer to an area on the worksurface affected by the defect, a length of the defect, a height or depth of the defect, or another characteristic. A defect location may include a coordinate location on a vehicle worksurface. Characterizing the defect may also include a depth 1424 of the defect with respect to the worksurface or a depth with respect to a layer of paint, such as whether the defect is located in a paint or clearcoat layer. Characterizing the defect may also include retrieving pre-repair images 1426 of the worksurface. Other features 1428 related to the defect may also be retrieved.

In block 1430, the defect is mapped to a repair strategy. In one embodiment, mapping the defect to a repair strategy includes a repair strategy generator, such as that of FIG. 13, receiving information about the vehicle and the defect and, based on the received information, generate a repair trajectory for the defect.

In block 1440, a path is generated for the repair strategy. The path may include one or more positions 1442. In one embodiment, the positions 1442 correspond to a regular shape, including a circle, an elliptical, a rose, an epitrochoid, or a hypotrochoid. In another embodiment, the position 1442 correspond to an irregular shape. The shape may include curvature or straight lines, convex or concave portions, or other features. Generating the path in block 1440 may also include generating one or more orientations 1444. For example, a backup pad may contact the worksurface evenly, such that an even pressure is applied over the surface of the backup pad, and onto the worksurface. In another embodiment, backup pad is at a tilt for at least a portion of the generated path. The tilt may be inward or outward, and may change during the repair, in some embodiments.

In block 1450, the generated path is time parametrized to generate a repair trajectory. Time parameterizing the path includes assigning a velocity and acceleration along the generated path. Generating the time parameterization requires satisfying dynamic constraints, as indicated in block 1452, such as maximum velocity and acceleration achievable by the end effector tool as well as the robot itself, as well as jerk. Time parameterization can also include verifying constraints after the trajectory is generated to ensure that the robot and the end effector can accomplish the trajectory.

In block 1460, repair instructions, including the time parameterization, is sent to a robot for implementation of the defect. Instructions may be sent automatically based on completion of the time parameterization, in one embodiment. In another embodiment, method 1400 repeats, as indicated by arrow 1470, and a repair trajectory is generated for a second defect. Alternatively, as indicated in FIG. 14, method 1400 may repeat for a series of defects and a complete trajectory is set for a vehicle repair before instructions are sent.

Figure 15:
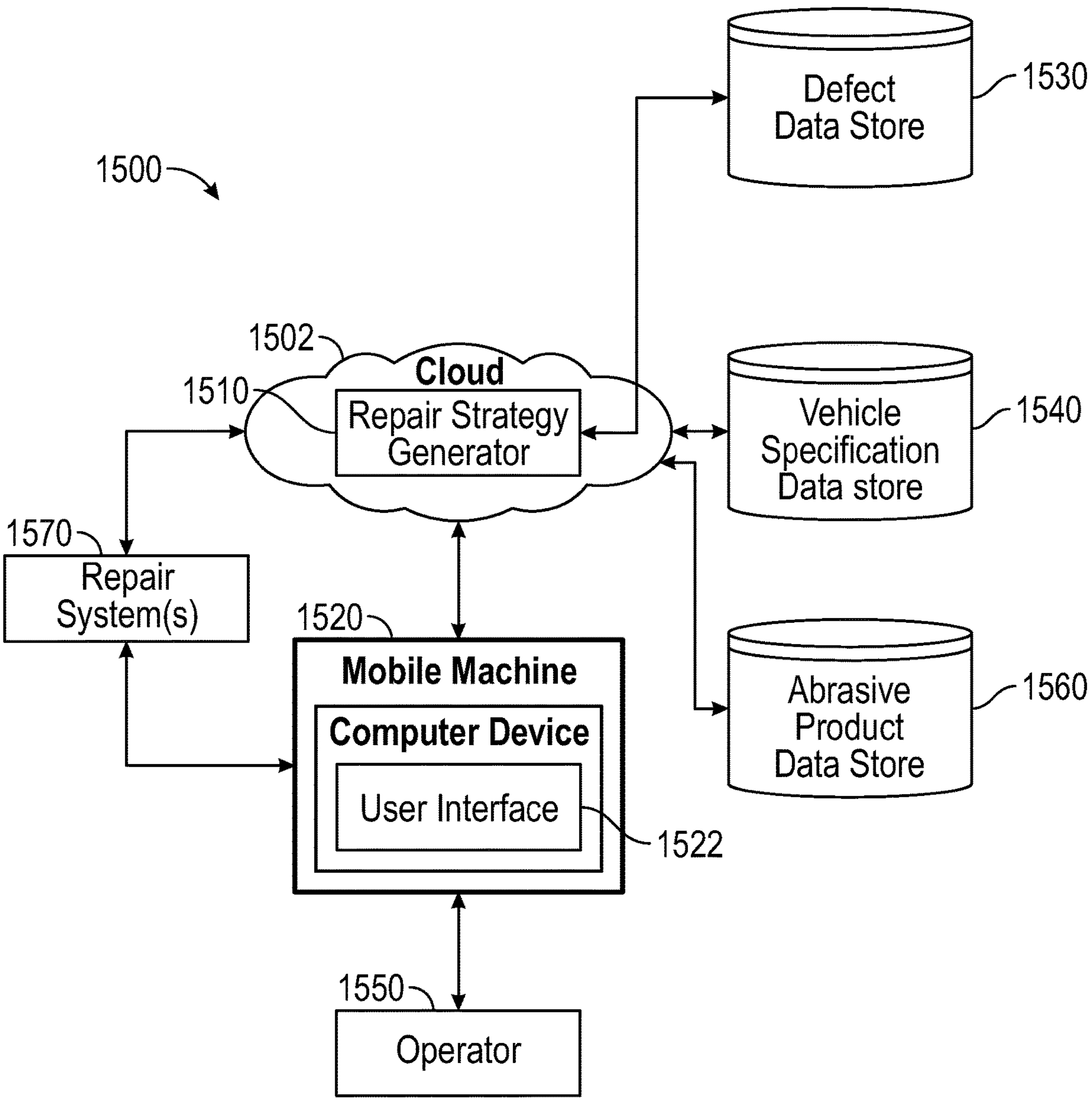
FIG. 15 is a repair strategy generation system architecture.

FIG. 15 is a block diagram of a defect detection and ranking system architecture. The remote server architecture 1500 illustrates one embodiment of an implementation of a defect detection and ranking system 1510. As an example, remote server architecture 1500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown or described in FIGS. 1-8 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided by a conventional server, installed on client devices directly, or in other ways.

In the example shown in FIG. 15, some items are similar to those shown in earlier figures. FIG. 15 specifically shows that a repair strategy generation system can be located at a remote server location 1502. Therefore, computing device 1520 accesses those systems through remote server location 1502. Operator 1550 can use computing device 1520 to access user interfaces 1522 as well.

FIG. 15 also depicts another example of a remote server architecture. FIG. 15 shows that it is also contemplated that some elements of systems described herein are disposed at remote server location 1502 while others are not. By way of example, storage 1530, 1540 or 1560 or repair systems 1570 can be disposed at a location separate from location 1502 and accessed through the remote server at location 1502. Regardless of where they are located, they can be accessed directly by computing device 1520, through a network (either a wide area network or a local area network), hosted at a remote site by a service, provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers.

It will also be noted that the elements of systems described herein, or portions of them, can be disposed on a wide variety of different devices. Some of those devices include servers, desktop computers, laptop computers, imbedded computer, industrial controllers, tablet computers, or other mobile devices, such as palm top computers, cell phones, smart phones, multimedia players, personal digital assistants, etc.

Figure 16:
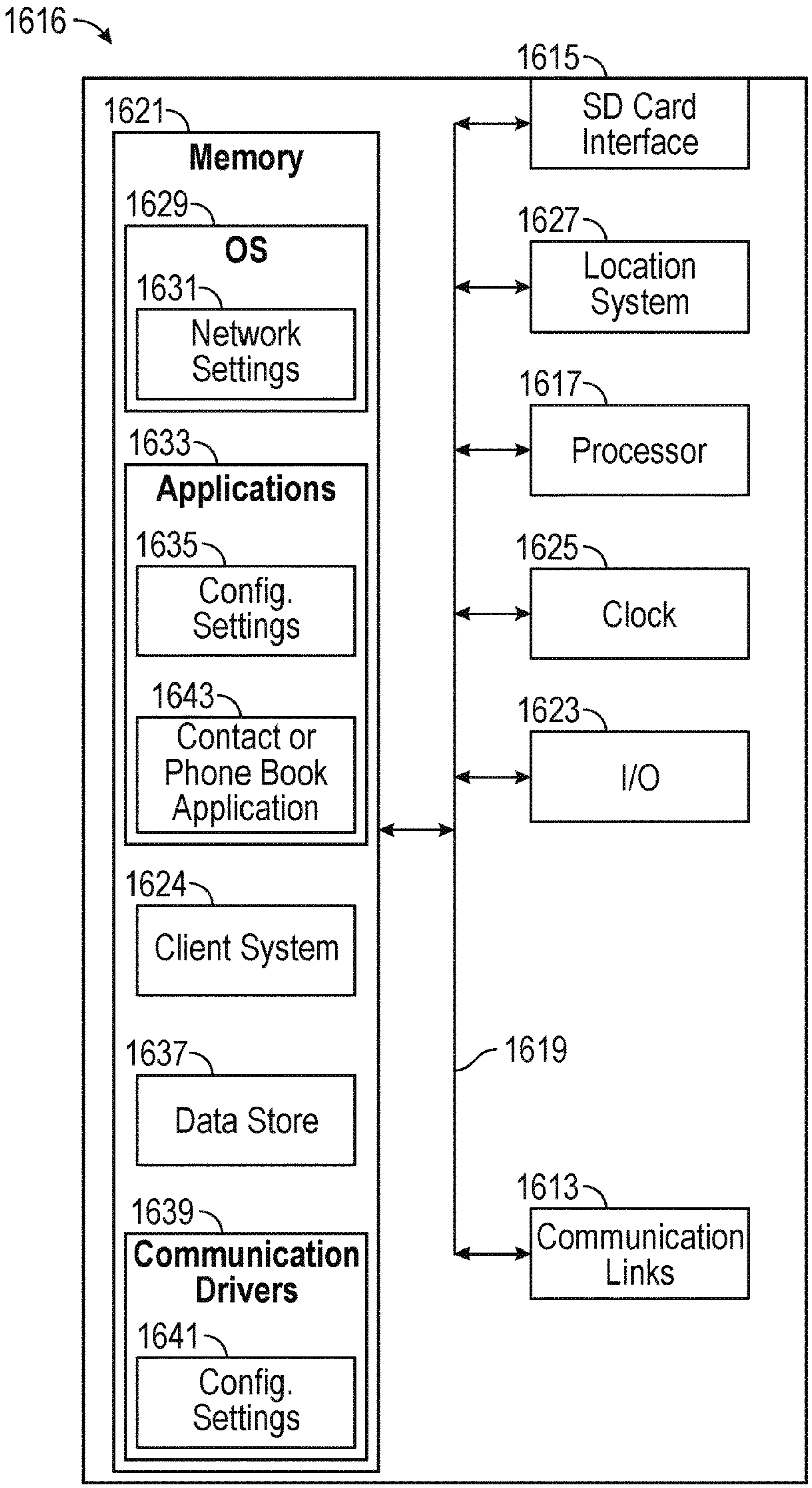
FIGS. 16-17 show examples of mobile devices that can be used in the embodiments shown in previous Figures.
Figure 17:
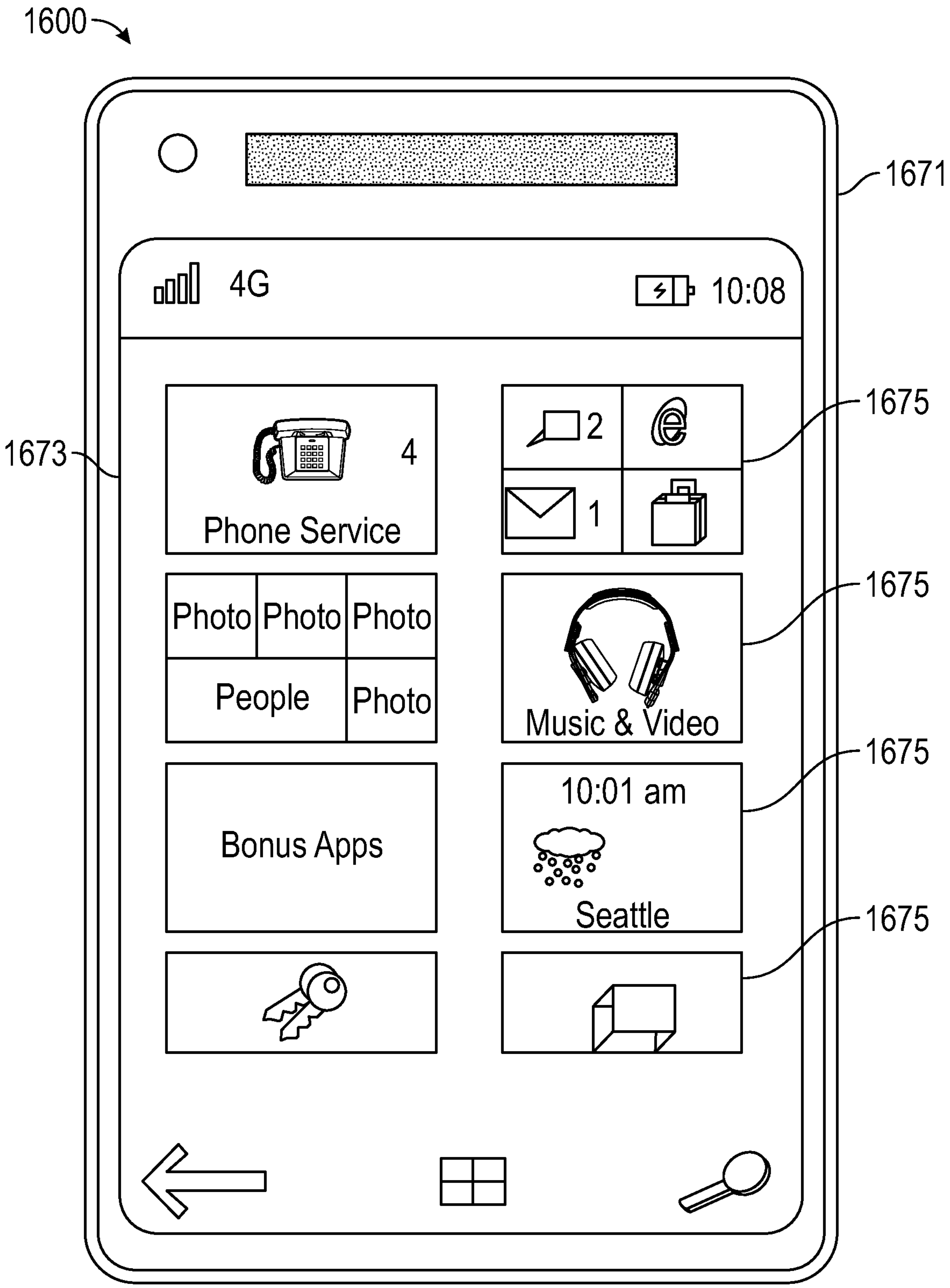

FIGS. 16-17 show examples of mobile devices that can be used in the embodiments shown in previous Figures.

FIG. 16 is a simplified block diagram of one illustrative example of a handheld or mobile computing device that can be used as a user's or client's handheld device 16 (e.g., as computing device 1520 in FIG. 15), in which the present system (or parts of it) can be deployed. For instance, a mobile device can be deployed in the operator compartment of computing device 1520 for use in generating, processing, or displaying the data. FIGS. 17 is another example of a handheld or mobile device.

FIG. 16 provides a general block diagram of the components of a client device 1616 that can run some components shown and described herein. Client device 1616 interacts with them, or runs some and interacts with some. In the device 1616, a communications link 1613 is provided that allows the handheld device to communicate with other computing devices and under some embodiments provides a channel for receiving information automatically, such as by scanning. Examples of communications link 1613 include allowing communication though one or more communication protocols, such as wireless services used to provide cellular access to a network, as well as protocols that provide local wireless connections to networks.

In other examples, applications can be received on a removable Secure Digital (SD) card that is connected to an interface 1615. Interface 1615 and communication links 1613 communicate with a processor 1617 (which can also embody a processor) along a bus 1619 that is also connected to memory 1621 and input/output (I/O) components 1623, as well as clock 1625 and location system 1627.

I/O components 1623, in one embodiment, are provided to facilitate input and output operations and the device 1616 can include input components such as buttons, touch sensors, optical sensors, microphones, touch screens, proximity sensors, accelerometers, orientation sensors and output components such as a display device, a speaker, and or a printer port. Other I/O components 1623 can be used as well.

Clock 1625 illustratively comprises a real time clock component that outputs a time and date. It can also provide timing functions for processor 1617.

Illustratively, location system 1627 includes a component that outputs a current geographical location of device 1616. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 1621 stores operating system 1629, network settings 1631, applications 1633, application configuration settings 1635, data store 1637, communication drivers 1639, and communication configuration settings 1641. Memory 1621 can include all types of tangible volatile and non-volatile computer-readable memory devices. It can also include computer storage media (described below). Memory 1621 stores computer readable instructions that, when executed by processor 1617, cause the processor to perform computer-implemented steps or functions according to the instructions. Processor 1617 can be activated by other components to facilitate their functionality as well.

FIG. 17 shows that the device can be a smart phone 1671. Smart phone 1671 has a touch sensitive display 1673 that displays icons or tiles or other user input mechanisms 1675. Mechanisms 1675 can be used by a user to run applications, make calls, perform data transfer operations, etc. In general, smart phone 1671 is built on a mobile operating system and offers more advanced computing capability and connectivity than a feature phone.

Note that other forms of the devices 1616 are possible.

Figure 18:
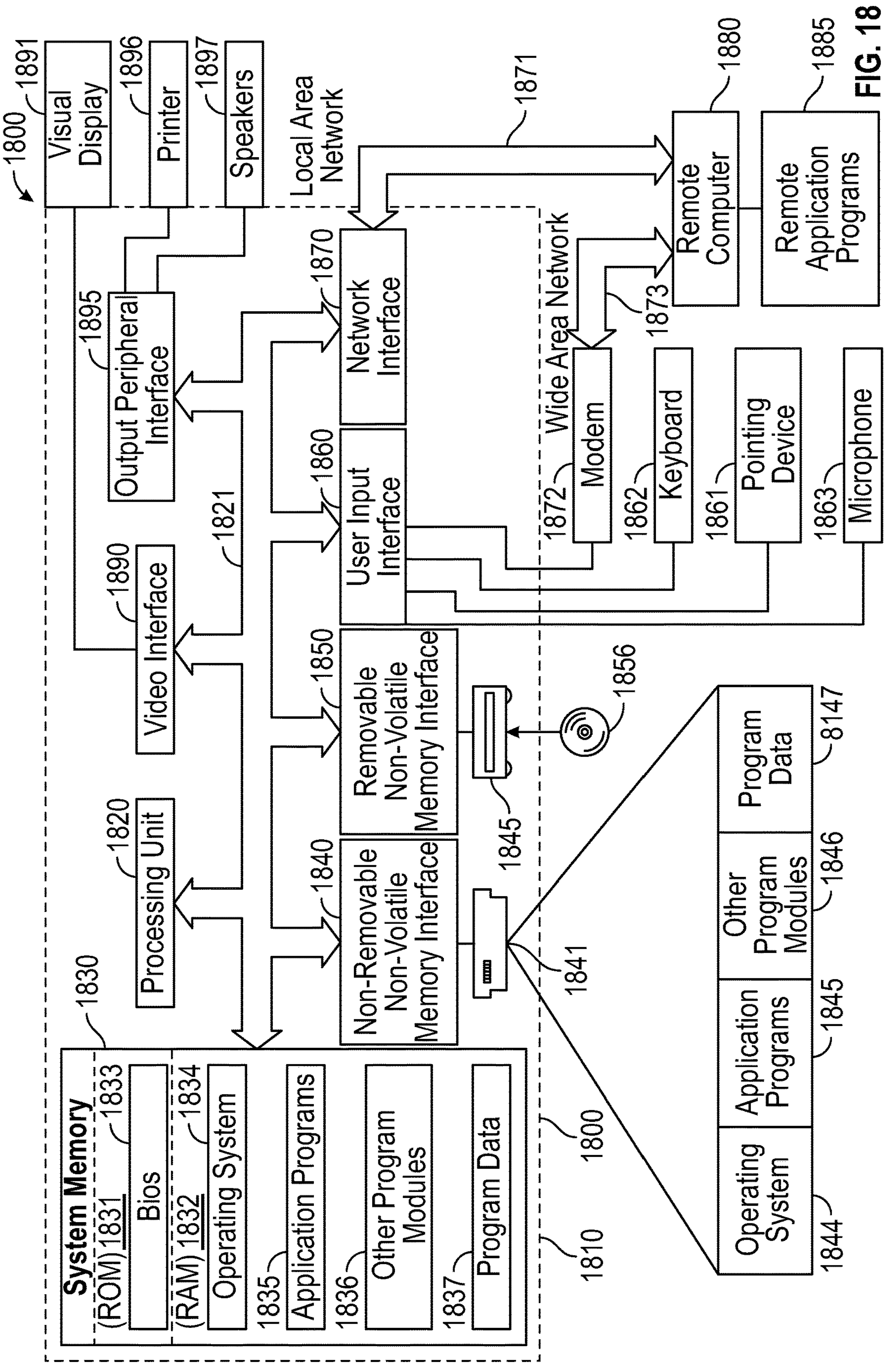
FIG. 18 is a block diagram of a computing environment that can be used in embodiments shown in previous Figures.

FIG. 18 is a block diagram of a computing environment that can be used in embodiments shown in previous Figures.

FIG. 18 is one example of a computing environment in which elements of systems and methods described herein, or parts of them (for example), can be deployed. With reference to FIG. 18, an example system for implementing some embodiments includes a general-purpose computing device in the form of a computer 1810. Components of computer 1810 may include, but are not limited to, a processing unit 1820 (which can comprise a processor), a system memory 1830, and a system bus 1821 that couples various system components including the system memory to the processing unit 1820. The system bus 1821 may be any of several types of bus structures including a memory bus or memory controller, a peripheral bus, and a local bus using any of a variety of bus architectures. Memory and programs described with respect to systems and methods described herein can be deployed in corresponding portions of FIG. 18.

Computer 1810 typically includes a variety of computer readable media. Computer readable media can be any available media that can be accessed by computer 1810 and includes both volatile/nonvolatile media and removable/non-removable media. By way of example, and not limitation, computer readable media may comprise computer storage media and communication media. Computer storage media is different from, and does not include, a modulated data signal or carrier wave. It includes hardware storage media including both volatile/nonvolatile and removable/non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1830 includes computer storage media in the form of volatile and/or nonvolatile memory such as read only memory (ROM) 1831 and random access memory (RAM) 1832. A basic input/output system 1833 (BIOS) containing the basic routines that help to transfer information between elements within computer 1810, such as during start-up, is typically stored in ROM 1831. RAM 1832 typically contains data and/or program modules that are immediately accessible to and/or presently being operated on by processing unit 1820. By way of example, and not limitation, FIG. 18 illustrates operating system 1834, application programs 1835, other program modules 1836, and program data 1837.

The computer 1810 may also include other removable/non-removable and volatile/nonvolatile computer storage media. By way of example only, FIG. 12 illustrates a hard disk drive 1841 that reads from or writes to non-removable, nonvolatile magnetic media, nonvolatile magnetic disk 1852, an optical disk drive 1855, and nonvolatile optical disk 1856. The hard disk drive 1841 is typically connected to the system bus 1821 through a non-removable memory interface such as interface 1840, and optical disk drive 1855 are typically connected to the system bus 1821 by a removable memory interface, such as interface 1850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 18, provide storage of computer readable instructions, data structures, program modules and other data for the computer 1810. In FIG. 18, for example, hard disk drive 1841 is illustrated as storing operating system 1844, application programs 1845, other program modules 1846, and program data 1847. Note that these components can either be the same as or different from operating system 1834, application programs 1835, other program modules 1836, and program data 1837.

A user may enter commands and information into the computer 1810 through input devices such as a keyboard 1862, a microphone 1863, and a pointing device 1861, such as a mouse, trackball or touch pad. Other input devices (not shown) may include a joystick, game pad, satellite receiver, scanner, or the like. These and other input devices are often connected to the processing unit 1820 through a user input interface 1860 that is coupled to the system bus, but may be connected by other interface and bus structures. A visual display 1891 or other type of display device is also connected to the system bus 1821 via an interface, such as a video interface 1890. In addition to the monitor, computers may also include other peripheral output devices such as speakers 1897 and printer 1896, which may be connected through an output peripheral interface 1895.

The computer 1810 is operated in a networked environment using logical connections, such as a Local Area Network (LAN) or Wide Area Network (WAN) to one or more remote computers, such as a remote computer 1880.

When used in a LAN networking environment, the computer 1810 is connected to the LAN 1871 through a network interface or adapter 1870. When used in a WAN networking environment, the computer 1810 typically includes a modem 1872 or other means for establishing communications over the WAN 1873, such as the Internet. In a networked environment, program modules may be stored in a remote memory storage device. FIG. 18 illustrates, for example, that remote application programs 1885 can reside on remote computer 1880.

A repaired area on a work surface is presented. The repaired area includes a repair boundary. Within the repair boundary, the work surface has a repair texture and, outside of the repair boundary, the work surface has a work surface texture. The repaired area also includes a repair depth distribution within the repair boundary and a concealing feature. The repaired area is a result of a robotic repair executed on the work surface to remove a defect.

The repaired area may be a result of an abrading operation on the worksurface. The abrading operation may have removed the work surface texture from a portion of the repaired area.

The repair boundary may be rotationally symmetric. The repair boundary may have a rotational symmetry is n-fold with n finite and greater than or equal to 2. The repair boundary may have a rotational symmetry is n-fold with n greater than or equal to 2 and less than or equal to 25. The repair boundary may have a rotational symmetry is n-fold with n greater than or equal to 3 and less than or equal to 25. The repair boundary may have a repair boundary's rotational symmetry is n-fold with n greater than or equal to 3 and less than or equal to 8.

The repair boundary may be an epitrochoid or a hypotrochoid. The repair boundary may be defined as having a parameter and an h parameter, and both the a and h parameter are non-zero.

The repair area may be implemented such that a path of the executed robotic repair is an epitrochoid or a hypotrochoid. The path is defined as having a parameter and an h parameter, and both the a and h parameter are non-zero.

The repair boundary may be asymmetric.

The repair boundary may be smaller than six times the effective tool radius.

The repair boundary may be smaller than four times the effective tool radius.

The repair boundary may be smaller than 3 times the effective tool radius.

The repair boundary may be smaller than 2 times the effective tool radius.

The repair area may be implemented such that the cut depth is monotonically decreasing radially outward from the center of the repaired area.

The repair area may be implemented such that a defect remnant remains within the repaired area.

The repair area may include feathering.

The repair area may be blended into the work surface.

The repair area may not be readily apparent to a human.

The repair boundary may have a convex portion or a convex portion.

The repair boundary may include a straight line.

The repair area may be implemented such that the repair depth profile comprises a first depth, with respect to the work surface, at a first point, and a second depth at a second point. The first and second points may be within the repair boundary.

The repair area may be implemented such that the repair depth profile comprises a first depth, with respect to the work surface, at a first point, and a second depth at a second point. The first and second points may be within the repair boundary.

The repair boundary may include a first cut profile, at a first point, a second cut profile, at a second point. The first cut profile may be different from the second cut profile.

The repair area may be implemented such that the first point is closer to the repair boundary than the second point. The first depth may be greater than the second depth.

A method for robotically repairing a defect on a worksurface is presented. The method includes receiving a surface mesh of the worksurface. The method also includes receiving a location of the defect. The location is a coordinate location corresponding to a point on the surface mesh. The method also includes generating a repair map for repairing the defect. The repair map comprises a repair position and a repair force at the repair position. The method also includes generating time parametrization of the repair map. The method also includes sending repair instructions to the repair robot. The repair instructions comprise the repair map and time parameterization. The repair robot comprises a tool configured to contact the defect and abrade the work surface at the defect location. The repair position comprises a position of the tool, and a force comprises a force exerted by the tool on the worksurface.

The method may be implemented such that the tool is coupled to a backup pad which is coupled to an abrasive article. The tool may have a repair orientation in the repair position. The repair orientation may include an orientation of the tool with respect to the worksurface. The orientation may be an outward tilt, and inward tilt or an even tilt with respect to the worksurface.

The method may be implemented such that the repair position is a first repair position, the repair orientation is a first repair orientation. The repair instructions may also include the tool, at a first time, in the first repair position, with a first applied repair force, at a first repair orientation, and the tool, at a second time, in the second repair position, with a second applied repair force, at a second repair orientation.

The method may be implemented such that the first repair position is different from the second repair position.

The method may be implemented such that the first repair position is the same as the second repair position.

The method may be implemented such that the first repair orientation is the same as the second repair orientation.

The method may be implemented such that the first repair orientation is different from the second repair orientation.

The method may be implemented such that the first applied repair force is the same as the second applied repair force.

The method may be implemented such that the first applied repair force is different from the second applied repair force.

The method may be implemented such that the tool has a moving component and wherein the repair instructions include a tool velocity for the moving component.

The method may be implemented such that the repair instructions also include a first tool velocity at the first time and a second tool velocity at the second time. The first and second tool velocities may be the same.

The method may be implemented such that the repair instructions also include a first tool velocity at the first time and a second tool velocity at the second time. The first and second tool velocities may be different.

The method may be implemented such that the tool is a rotary sander, and the tool velocity is a rotational velocity.

The method may be implemented such that the tool is a vibratory sander, and the tool velocity is a rate of vibration.

The method may be implemented such that the tool is an orbital sander with an orbit, and the tool velocity is a rotational orbit velocity.

The method may be implemented such that the tool is a random orbital sander with an orbit, and the tool velocity is a rotational orbit velocity.

The method may be implemented such that the tool is a random orbital sander with an axis of motion and the tool velocity is an axial velocity.

The method may be implemented such that the repair map comprises an ordered plurality of positions, and wherein time parameterization comprises the tool passing through the ordered plurality of positions in turn.

The method may be implemented such that the ordered plurality of positions forms an open path, such that a starting position is different from an ending position.

The method may be implemented such that the ordered plurality of positions forms a closed path, such that a starting position is the same as an ending position.

The method may be implemented such that the plurality of positions cause the tool to trace out a shape.

The method may be implemented such that the shape is a regular shape selected from the group consisting of a circle, an ellipse, a polygon, a rose, an epitrochoid, or a hypotrochoid.

The method may be implemented such that the shape is an irregular shape with a convex portion, a concave portion, a straight portion or a curved portion.

The method may be implemented such that the repair instructions include a command for the repair robot to execute the repair instructions.

The method may be implemented such that the repair instructions also include a command to exchange the abrasive article for a new abrasive article.

The method may be implemented such that the command is based on a received abrasive article parameter. The abrasive article parameter may be an abrasive grade or an abrasive article remaining life.

The method may be implemented such that a repair area comprising an area on the worksurface abraded by the tool, is larger than an area of a backup pad coupled to the tool.

The method may be implemented such that the repair area has an abrading depth profile across the repair area, and wherein the abrading depth profile is inconsistent across the repair surface.

The method may be implemented such that a first abrading depth, with respect to the worksurface, at a first point is shallower than a second abrading depth at a second point.

A repair robot for repairing a defect on a worksurface is presented. The repair robot has a robot arm with a base at a first edge and a flange at a second end. The repair robot also has a force control coupled to the flange. The repair robot also has an end effector coupled to the force control. The repair robot also has a tool coupled to the end effector. The repair robot also has a backup pad coupled to the tool. The backup pad is also coupled to an abrasive disc. The repair robot also has a robot controller configured to cause the motive arm to move the tool into position above the defect and, in response to a received repair instruction, execute a repair trajectory. The repair trajectory comprises the tool tracing a repair path on the worksurface. The repair path comprises a plurality of positions and, at each of the plurality of positions, a tool orientation, a tool force and a tool velocity. The repair robot also has computer implemented instructions that, when executed, cause the repair robot to execute the received repair instruction.

The repair robot may also be implemented such that a first tool orientation at a first tool position is different than a second tool orientation at a second tool position.

The repair robot may also be implemented such that a first tool force at a first tool position is different than a second tool force at a second tool position.

The repair robot may also be implemented such that a first tool velocity at a first tool position is different than a second tool velocity at a second tool position.

The repair robot may also be implemented such that the repair path comprises a regular shape.

The repair robot may also be implemented such that the regular shape is a circle, an ellipse, a polygon, a rose, an epitrochoid or a hypotrochoid.

The repair robot may also be implemented such that the repair path comprises an irregular shape with a convex portion or concave portion.

The repair robot may also be implemented such that the repair path has rotational symmetry.

The repair robot may also be implemented such that the repair path is free of rotational symmetry.

The repair robot may also be implemented such that the repair path is asymmetric.

The repair robot may also be implemented such that the abrasive disc is removeable and the repair instructions comprise an instruction to remove a current abrasive disc and place a new abrasive disc on the backup pad.

The repair robot may also be implemented such that the robot controller generates the repair instruction based on a defect characteristic. The defect characteristic is a defect type, a defect size or a defect location on the worksurface.

The repair robot may also be implemented such that the robot controller generates the repair instruction based on an abrasive disc parameter. The abrasive disc parameter is an abrasive grade or a remaining disc life.

The repair robot may also be implemented such that the robot controller generates the repair instruction based on a work surface parameter. The work surface parameter is a paint parameter or a defect depth.

The repair robot may also be implemented such that the work surface is a vehicle, and wherein the paint parameter is a number of paint coatings, a type of paint coatings, or a paint hardness.

The repair robot may also be implemented such that the vehicle is an automobile.

The repair robot may also be implemented such that the base is stationary with respect to the automobile during a repair process.

The repair robot may also be implemented such that the base is moving with respect to the automobile during a repair process.

The repair robot may also be implemented such that both the base and the automobile are moving during a repair process.

The repair robot may also be implemented such that the tool is a vibratory sander and the tool velocity is a rate of vibration of the vibratory sander.

The repair robot may also be implemented such that the tool is a rotary sander and the tool velocity is a rotational velocity.

The repair robot may also be implemented such that the tool is an orbital sander with an orbit and the tool velocity is an orbit rotational velocity.

The repair robot may also be implemented such that the tool is a random orbital sander with an orbit and the tool velocity is an orbit rotational velocity.

The repair robot may also be implemented such that the tool is a random orbital sander with an axis and the tool is an axial velocity.

A repair instruction for a robotic repair unit is presented. The repair instruction includes a starting position for a tool coupled to the robotic repair unit. The tool comprises an abrasive article configured to contact and abrade a worksurface. The repair instruction also includes a repair path comprising a first position for the tool, at a first time, and a second position for the tool, at a second time. The repair instruction also includes a force profile comprising a first applied force by the robotic repair unit on the abrasive article at the first time, and a second applied force by the robotic repair unit on the abrasive article at the second time. The repair instruction may also have a tool velocity profile comprising a first tool velocity at the first time and a second tool velocity at the second time. The repair instruction may also have computer readable instructions that, when executed, cause the repair robot to execute the received repair instruction.

The repair instruction may also have an ending position for the tool, wherein the ending position is different from the starting position.

The repair instructions may be implemented such that the worksurface comprises a defect, and the repair instruction is configured to reduce a visual appearance of the defect on the worksurface.

The repair instructions may be implemented such that a perimeter of a repair area is blended into the worksurface. Blending may include creating feathering along the edges of the repair area. Blending may include abrading a repair depth profile within the repair area of the worksurface.

The repair instructions may be implemented such that a first repair depth, at a first position, is smaller than a second repair depth, at a second position. The first position may be closer to a repair perimeter than the second position.

The repair instructions may be implemented such that the abrasive article has an abrasive article area, and wherein the repair area is greater than the abrasive article area.

The repair instructions may be implemented such that the repair area is greater than twice the abrasive article area.

The repair instructions may be implemented such that the repair area has a dimension that is greater than twice a diameter of the abrasive article.

The repair instructions may be implemented such that the second position is the same as the first position.

The repair instructions may be implemented such that the second position is different from the first position.

The repair instructions may be implemented such that the first force is different than the second force.

The repair instructions may be implemented such that the first tool velocity is different than the second tool velocity.

The repair instructions may also include a first tool orientation at the first time and a second tool orientation at the second time. The first and second tool orientations may be selected from the group consisting of: even with the worksurface, tilted outward with respect to the worksurface, and tilted inward with respect to the worksurface.

The repair instructions may be implemented such that the first tool orientation is different from the second tool orientation.

The repair instructions may be implemented such that the repair path comprises an open path such that the starting position is different from an ending position.

The repair instructions may be implemented such that the repair path comprises a closed path such that the starting position is the same as an ending position.

The repair instructions may be implemented such that the repair path comprises a regular shape, and wherein the regular shape comprises a circle, an ellipse, a polygon, an epitrochoid, a hypotrochoid or a rose.

The repair instructions may be implemented such that the repair path has rotational symmetry.

The repair instructions may be implemented such that the repair path is asymmetric.

The repair instructions may be implemented such that the repair path is an irregular path. The irregular path has a concave portion or a convex portion.

The repair instructions may be implemented such that the starting position comprises the tool substantially in contact with the defect.

The repair instructions may be implemented such that the work surface is a vehicle.

The repair instructions may be implemented such that the repair instructions are for a repair robot that remains stationary during a repair. The worksurface may be stationary during a repair. The worksurface may be moving during a repair.

The repair instructions may be for a repair robot that is moving during a repair. The worksurface may be stationary during a repair. The worksurface may be moving during a repair.

The repair instructions may be implemented such that the tool is a vibratory sander, and the first velocity is a first vibration rate and the second velocity is a second vibration rate.

The repair instructions may be implemented such that the tool is a rotary sander, the first velocity is a first rotational velocity and the second velocity is a second rotational velocity.

The repair instructions may be implemented such that the tool is an orbital sander with an orbit, and wherein the first velocity is a first orbit rotational velocity, and wherein the second velocity is a second orbit rotational velocity.

The repair instructions may be implemented such that the tool is a random orbital sander with an orbit, and wherein the first velocity is a first orbit rotational velocity and the second velocity is a second orbit rotational velocity.

The repair instructions may be implemented such that the tool is a random orbital sander with a movement axis, and wherein the first velocity is a first axial velocity and the second velocity is a second axial velocity.

A repair strategy generation system for abrading a defect on a worksurface is presented. The repair strategy generation system includes a work surface retriever configured to retrieve a surface mesh associated with the worksurface. The system also includes a defect retriever configured to retrieve a defect characteristic for the defect. The system also includes a repair trajectory generator configured to generate a repair trajectory for abrading the defect, based on the defect characteristic. The repair trajectory generator includes a path generator configured to generate a path for a tool on a robotic repair unit to execute, a force profile generator configured to generate a force profile for the tool to exert on an abrasive article coupled to the tool, and a time parameterizer configured to associate a velocity with the generated path such that, at a first time, the tool is at a first position and exerting a first force and, at a second time, is in a second position and exerting a second force. The system also includes an instruction communicator configured to communicate the generated repair trajectory to a robotic repair unit to execute. The system also includes a controller with a processor and computer implemented instructions that, when executed, cause the work surface retriever to retrieve the surface mesh, the defect retriever to retrieve the defect characteristic, the repair trajectory generator to generate the repair trajectory, and the instruction communicator to communicate the generated repair trajectory.

The repair strategy generation system may also include an abrasive product retriever configured to retrieve an abrasive article characteristic about the abrasive article.

The repair strategy generation system may be implemented such that the abrasive article characteristic is an abrasive grade or a remaining abrasive disc life.

The repair strategy generation system may also include an abrasive disc change decision generator configured to generate an abrasive article change command based on the abrasive article characteristic. The instruction communicator communicates the abrasive article change command with the generated repair trajectory.

The repair strategy generation system may be implemented such that the instruction communicator also communicates a repair initiation command for the robotic repair unit to execute the repair trajectory when received.

The repair strategy generation system may be implemented such that the instruction communicator also communicates a repair initiation command for the robotic repair unit to execute the abrasive article change command prior to executing the repair trajectory.

The repair strategy generation system may be implemented such that the defect characteristic is a pre-repair image of the defect.

The repair strategy generation system may be implemented such that the defect characteristic is a defect type, defect location on the worksurface, a defect depth with respect to a surface of the worksurface, or a defect size parameter.

The repair strategy generation system may be implemented such that the repair trajectory is generated at least in part based on a past defect repair.

The repair strategy generation system may be implemented such that the work surface retriever also retrieves a work surface characteristic.

The repair strategy generation system may be implemented such that the work surface is a vehicle, and wherein the worksurface characteristic is an orange peel characteristic.

The repair strategy generation system may be implemented such that the worksurface characteristic is a paint characteristic.

The repair strategy generation system may be implemented such that the paint characteristic is a paint hardness, a paint color, a paint layer thickness, a number of paint layers, or a type of paint.

The repair strategy generation system may be implemented such that the defect characteristic is a defect depth within the paint.

The repair strategy generation system may be implemented such that the first position and the second position are the same.

The repair strategy generation system may be implemented such that the first position and the second position are different.

The repair strategy generation system may be implemented such that a first area of the abrasive article contacting the worksurface does not overlap with a second area of the abrasive article contacting the worksurface. The first area may correspond to the abrasive article in the first position and the second area may correspond to the abrasive article in the second position.

The repair strategy generation system may be implemented such that the first applied force is different than the second applied force.

The repair strategy generation system may be implemented such that the first applied force is the same as the second applied force.

The repair strategy generation system may be implemented such that the tool has an orientation with respect to the worksurface such that a force profile is exerted along an area of the abrasive article in contact with the worksurface.

The repair strategy generation system may be implemented such that the orientation is an outward tilt, an inward tilt, or an even orientation with respect to the worksurface.

The repair strategy generation system may be implemented such that the repair path is an open path such that a starting position and an ending position of the tool are different.

The repair strategy generation system may be implemented such that the repair path is a closed path such that a starting position and an ending position are the same.

The repair strategy generation system may be implemented such that the repair path is a circle, an ellipse, a polygon, a rose, an epitrochoid, or a hypotrochoid.

The repair strategy generation system may be implemented such that the repair path is an irregular shape.

The repair strategy generation system may be implemented such that the repair path comprises a convex portion.

The repair strategy generation system may be implemented such that the repair path comprises a concave portion.

The repair strategy generation system may be implemented such that the repair path comprises a straight portion.

The repair strategy generation system may be implemented such that the repair path has rotational symmetry.

The repair strategy generation system may be implemented such that the repair path is asymmetric.

The repair strategy generation system may be implemented such that the tool is a vibratory sander, and the tool velocity is a vibration rate.

The repair strategy generation system may be implemented such that the tool is a rotary sander, and the tool velocity is a rotational velocity.

The repair strategy generation system may be implemented such that the tool is an orbital sander with an orbit, and the tool velocity is an orbital rotational velocity.

The repair strategy generation system may be implemented such that the tool is a random orbital sander with an orbit, and the tool velocity is an orbital rotational velocity.

The repair strategy generation system may be implemented such that the tool is a random orbital sander with an axis of movement and the tool velocity is an axial velocity.

The repair strategy generation system may be implemented such that the tool couples to a backup pad which couples to the adhesive article.

A method for generating a repair trajectory for a worksurface is presented. The method includes retrieving a worksurface parameter using a worksurface parameter retriever. The method also includes retrieving a defect parameter for a defect on the worksurface using a defect parameter retriever. The defect parameter comprises a location of the defect on the worksurface. The method also includes generating a repair path for the defect using a repair path generator. The repair path comprises a repair position, a repair force, and a repair orientation for a tool contacting the worksurface. The method also includes time parameterizing the repair path, using a time parameterizer, to generate a repair trajectory. The method is implemented by a repair robot controller with a processor and stored computer implemented instructions that, when executed, cause the controller to complete the steps of retrieving a worksurface parameter, retrieving a defect parameter, generating a repair path and time parameterizing the repair path.

The method may also include communicating the repair trajectory on to a repair robot using an instruction communicator.

The method may also include checking the trajectory for compliance with a dynamic constraint of a repair robot. The dynamic constraint comprises a maximum acceleration, maximum velocity, or jerk.

The method may be implemented such that the trajectory comprises a first time and a second time. The repair position may be a first repair position, the repair force is a first repair force, and the repair orientation is a first repair orientation. At the first time, the tool is at the first repair position, in the first orientation, with the first repair force. At the second time, the tool is at the second repair position, in the second repair orientation, with the second repair force.

The method may be implemented such that the first repair position is the same as the second repair position.

The method may be implemented such that the first repair position is different from the second repair position.

The method may be implemented such that the first repair force is the same as the second repair force.

The method may be implemented such that the first repair force is different from the second repair force.

The method may be implemented such that the first repair orientation is the same as the second repair orientation.

The method may be implemented such that the first repair orientation is different from the second repair orientation.

The method may be implemented such that the tool has a moving component. The moving component has a first velocity at the first time and a second velocity at the second time.

The method may be implemented such that the first velocity is different than the second velocity.

The method may be implemented such that the first velocity is the same as the second velocity.

The method may be implemented such that the repair tool is a vibratory sander, and the first and second tool velocities are a first and second rate of vibration.

The method may be implemented such that the repair tool is a rotary sander, and the first and second tool velocities are a first and second rate of rotation.

The method may be implemented such that the repair tool is an orbital sander with an orbit, and the first and second tool velocities are a first and second rate of rotation.

The method may be implemented such that the repair tool is a random orbital sander with an axis of motion and the first and second tool velocities are a first and second rate of axial motion.

The method may be implemented such that the repair orientation is even with respect to the worksurface, an outward tilt with respect to the worksurface, or an inward tilt with respect to the worksurface.

The method may be implemented such that the tool is coupled to a backup pad, and wherein the backup pad is removably coupled to an abrasive article, and the abrasive article directly contacts the worksurface.

The method may be implemented such that the method also comprises retrieving an abrasive article characteristic and, based on the abrasive article characteristic, generating a change abrasive article command.

The method may be implemented such that the abrasive article characteristic is an abrasive grade or an abrasive article life remaining indicator.

The method may be implemented such that the repair path comprises a plurality of positions through which the tool will pass when executing the repair path.

The method may be implemented such that the repair path is an open path such that a starting position is different from an ending position.

The method may be implemented such that the repair path is a closed path such that a starting position is the same as the ending position.

The method may be implemented such that the repair path comprises a regular shape selected from the group consisting of a circle, an ellipse, a rose, an epitrochoid, a hypotrochoid or a polygon.

The method may be implemented such that the repair path comprises an irregular shape with a feature selected from the group consisting of a convex portion, a concave portion, a straight line, and a curved line.

The method may be implemented such that the repair path has rotational symmetry.

The method may be implemented such that the repair path is asymmetric.

The method may be implemented such that the worksurface is a vehicle.

The method may be implemented such that the worksurface parameter is a paint characteristic of a layer of paint on the vehicle.

The method may be implemented such that the worksurface parameter is an orange peel texture of the vehicle.

The method may be implemented such that the defect parameter is a defect type.

The method may be implemented such that the defect parameter is a defect depth with respect to the worksurface.

The method may be implemented such that the defect parameter is a pre-repair image of the defect.

The method may be implemented such that the repair force is selected to cause feathering along a repair area.

A defect repair trajectory for a repair robot is presented. The trajectory includes a starting position for a tool of the repair robot and an ending position for the tool on a worksurface. The tool contacts and abrades the worksurface. The trajectory also includes a trajectory shape, that includes a first position of the tool at a first time and a second position of the tool at a second time. The trajectory also includes a force profile that includes a first force applied at the first time and a second force applied at the second time. The trajectory also includes a velocity profile that includes a first tool velocity at the first time and a second tool velocity at the second time. The trajectory also includes an orientation profile that includes a first orientation of the tool at the first time and a second orientation of the tool at the second time.

The defect repair trajectory may be implemented such that the first force applied is the same as the second force applied.

The defect repair trajectory may be implemented such that the first force applied is different from the second force applied.

The defect repair trajectory may be implemented such that the first position is the same as the second position.

The defect repair trajectory may be implemented such that the first position is different from the second position.

The defect repair trajectory may be implemented such that the first tool velocity is the same as the second tool velocity.

The defect repair trajectory may be implemented such that the first tool velocity is different form the second tool velocity.

The defect repair trajectory may be implemented such that the first orientation is different from the second orientation.

The defect repair trajectory may be implemented such that the first orientation is the same as the second orientation.

The defect repair trajectory may be implemented such that the ending position is different from the starting position.

The defect repair trajectory may be implemented such that the ending position is the same as the starting position.

The defect repair trajectory may be implemented such that the trajectory shape is a circle, an ellipse, a rose, an epitrochoid, a hypotrochoid or a polygon.

The defect repair trajectory may be implemented such that the trajectory shape has rotational symmetry.

The defect repair trajectory may be implemented such that the trajectory shape is asymmetric.

The defect repair trajectory may be implemented such that the trajectory shape has a convex or concave portion and a perimeter with curved portion or a straight portion.

The defect repair trajectory may be implemented such that the tool is a rotary sander, and the first and second tool velocity are rotational velocities.

The defect repair trajectory may be implemented such that the tool is a vibratory sander and the first and second tool velocities are vibration rates.

The defect repair trajectory may be implemented such that the tool is an orbital sander with an orbit and the first and second tool velocities are orbit rotational velocities.

The defect repair trajectory may be implemented such that the tool is a random orbital sander with an orbit and the first and second tool velocities are orbit rotational velocities.

The defect repair trajectory may be implemented such that the tool is a random orbital sander with an axis of movement and the first and second tool velocities are axial velocities.

The defect repair trajectory may be implemented such that the repair path includes the tool traveling over the defect.

The defect repair trajectory may be implemented such that a defect remnant remains after the repair path is executed.

The defect repair trajectory may be implemented such that the worksurface is a vehicle, and abrading the worksurface comprises changing a texture of the worksurface within a repair area.

The defect repair trajectory may be implemented such that the texture of the worksurface within the repair area is different than a texture of the worksurface outside of the repair area.

The defect repair trajectory may be implemented such that the repair area comprises a boundary area where a repair area texture is blended into the worksurface texture.

The defect repair trajectory may be implemented such that the boundary area comprises feathering.

The above-presented description and figures are intended by way of example only and are not intended to limit the illustrative embodiments in any way except as set forth in the appended claims. It is noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

EXAMPLES

FIGS. 19-23 illustrate some Examples of feathering and surface roughness. FIGS. 19A-19E illustrate examples of feathering. FIG. 19A illustrates a grayscale image of a post-repair area on a reflective surface. The abraded area 1902 is on a reflective surface 1904. The repair in FIG. 19A illustrates a feathered transition 1910. The example abraded area 1902 is roughly 40 mm in width. Surface 1904 is clear coated on top of a painted surface. The darkening of abraded area 1902 represents the disruption of the reflective surface 1904. This disruption is caused by the cutting or smearing of the surface by an abrasive used to remove or reduce a flaw. Abraded area 1902 is significantly larger than the defect repaired.

Feathering is important to prevent visible valleys from being apparent to an individual looking at the reflective surface once the abraded area 1902 is polished. As discussed above, reflective surface 1904 may have a rippling surface feature referred to as "orange peel."

Figure 19A:
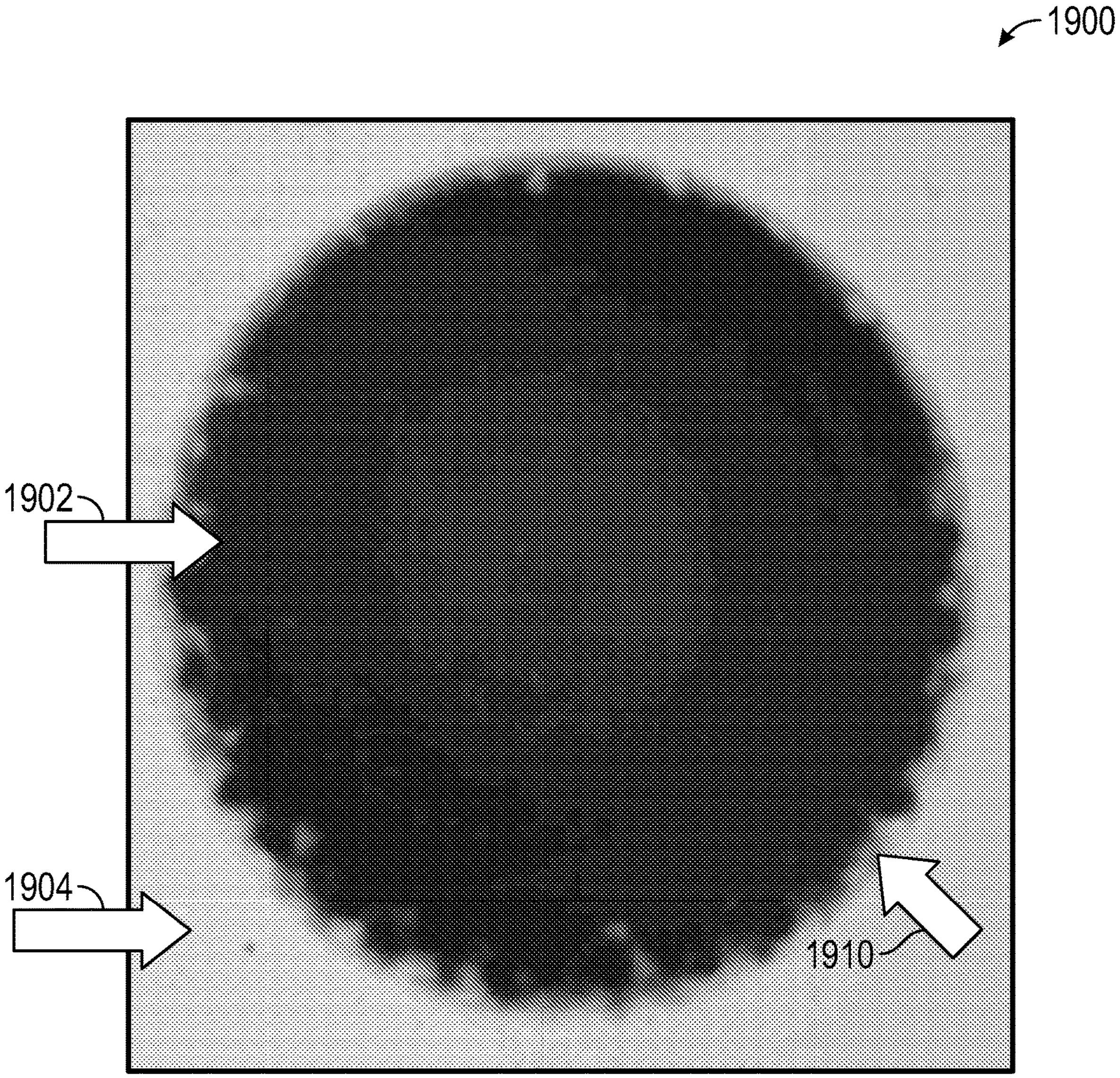
FIGS. 19-24 illustrate images and analysis of defects described in further detail in the Examples.
Figure 19B:
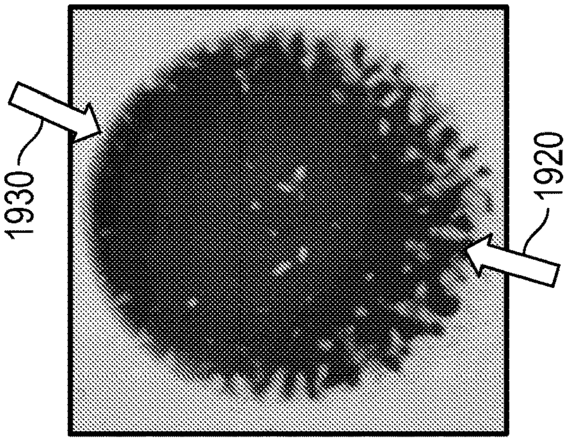
Figure 19C:
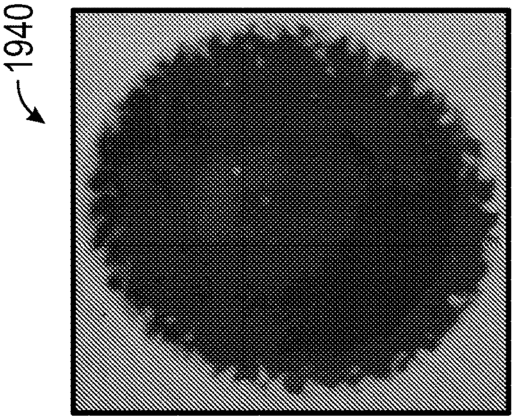
Figure 19D:
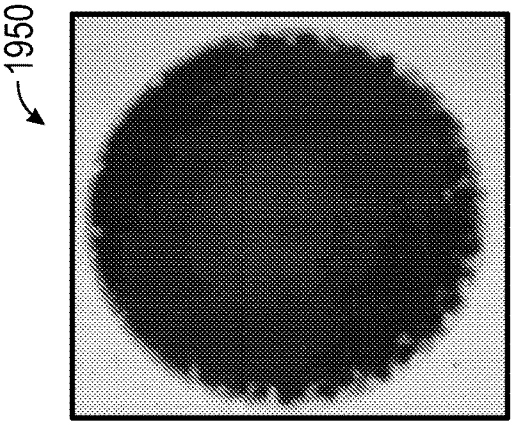
Figure 19E:
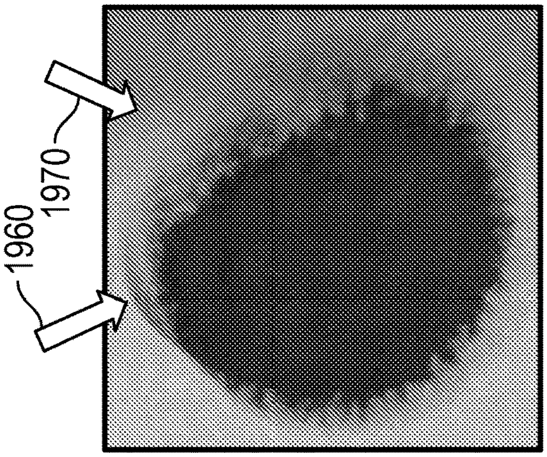

FIGS. 19B-19E illustrate four examples of treated surfaces. FIG. 19B illustrates an unevenly feathered abrasive surface with gradual feathering 1920 on one side and little feathering 1930 on the other side. FIG. 19C illustrates an example 1940 with irregular feathering around the edges. FIG. 19E illustrates an undercut with no feathering 1960, and lopsided feathering 1970. FIG. 19D illustrates a preferred feathering 1950, which is evenly present around the perimeter.

Figure 20A:
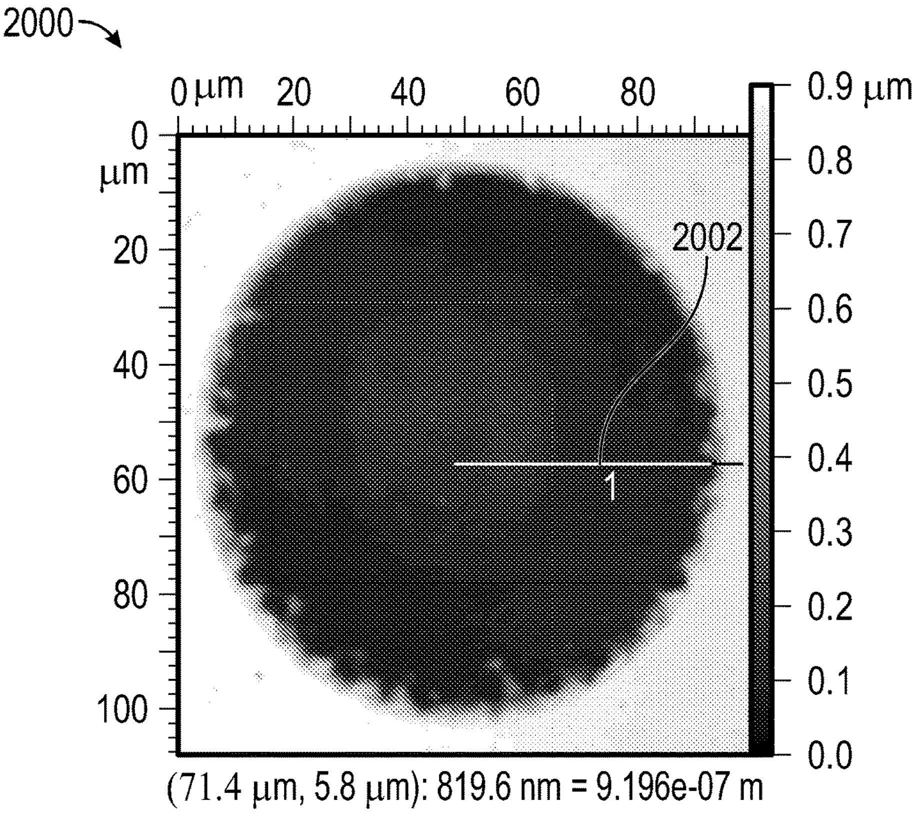
Figure 20B:
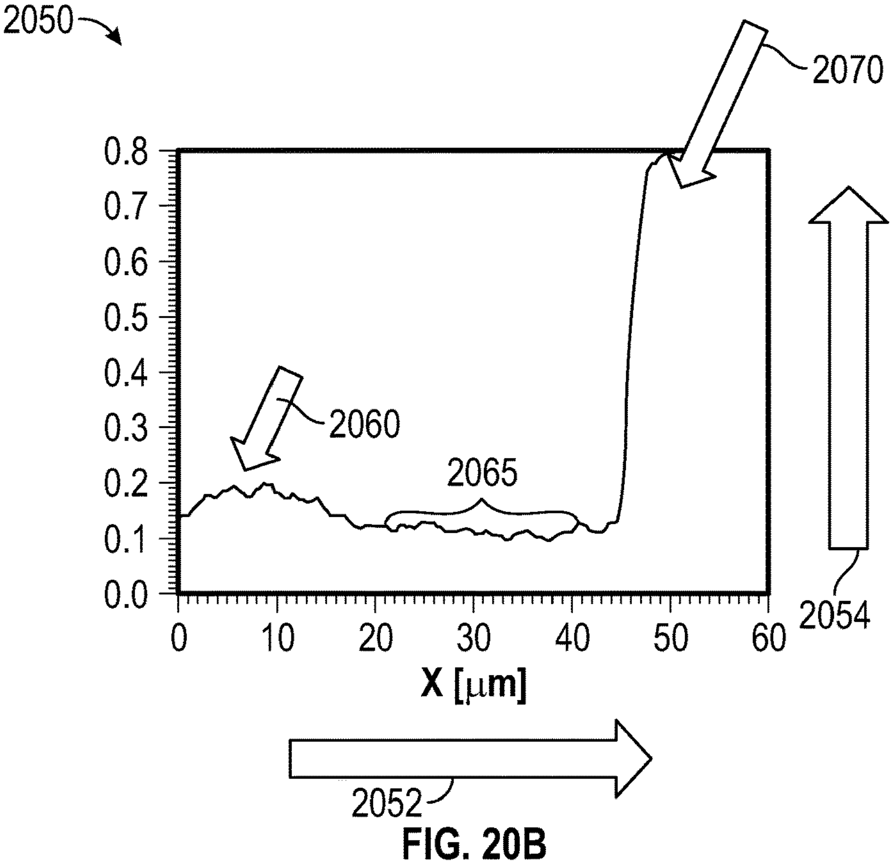

An amount of feathering present can be measured by quantifying the disruption to the reflective surface across a specific path or area. FIGS. 20A and 20B illustrate examples of feathering measurement techniques 2000, 2050. FIG. 20A illustrates a line 2002 drawn from the center of the repair area across the feathered transition at the edge. FIG. 20B illustrates an analysis of the pixels from FIG. 20A along line 2002, extending along axis 2052, which represents a number of pixels from the image center. A pixel value 2054 represents a lightness value of the pixel. As illustrated, a lighter center 2060 is present, which transitions to darker pixels in a more heavily abraded center ring 2065 of the abraded area before transitioning to fully reflective surface 2070.

Figure 21A:
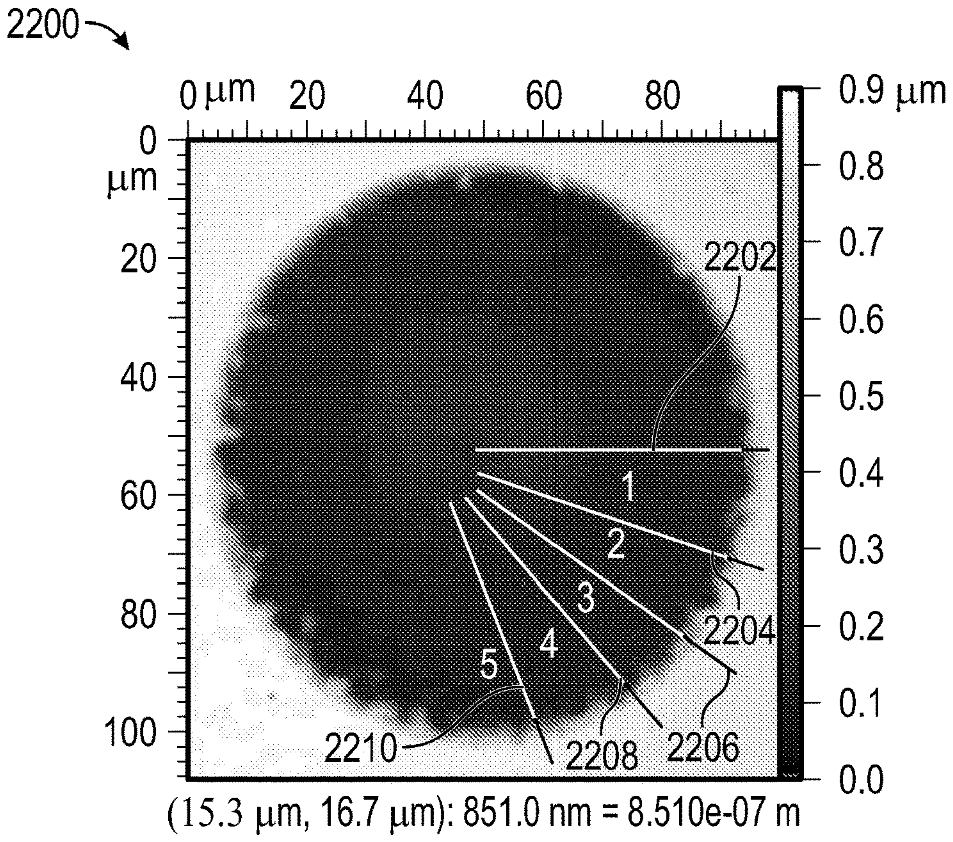
Figure 21B:
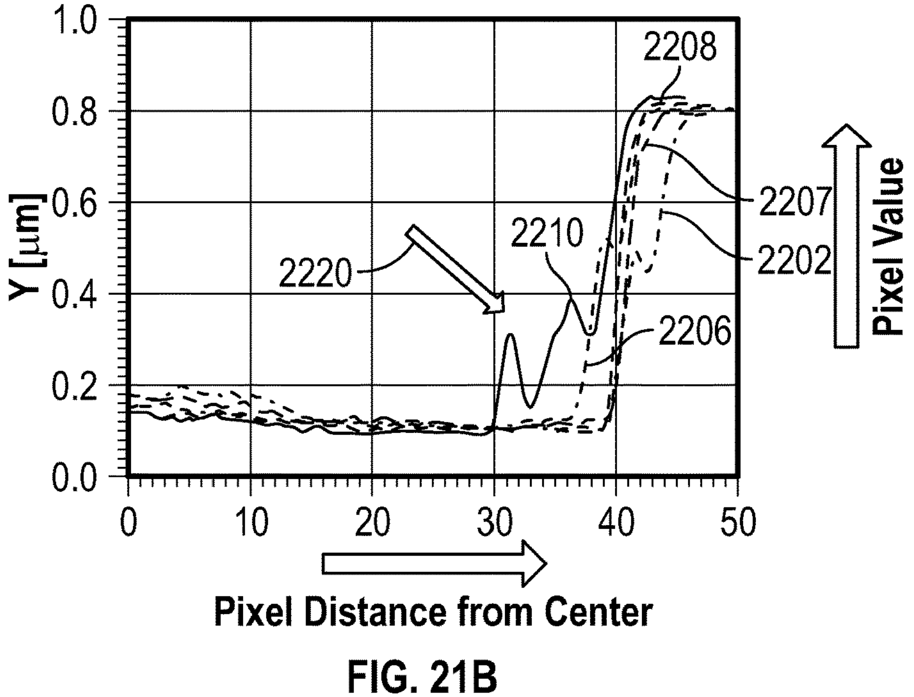
Figure 22B:
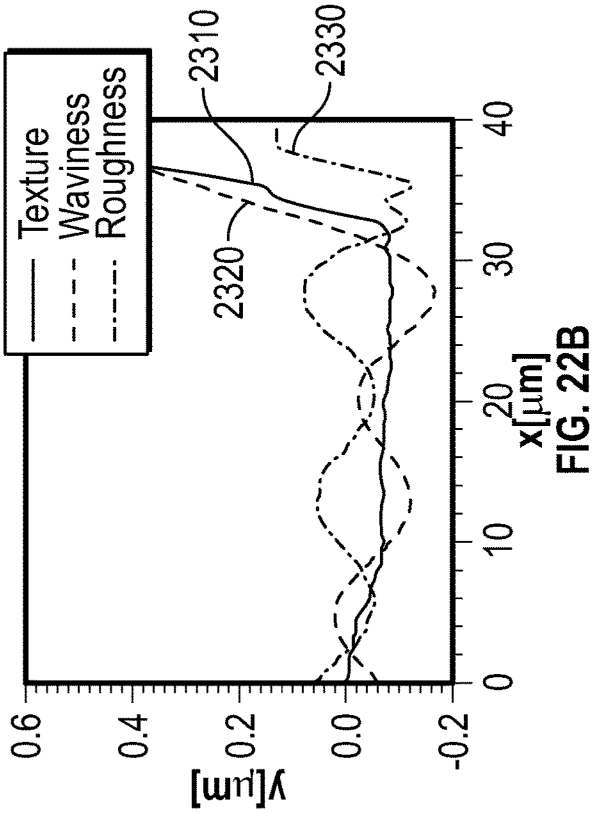

As illustrated in FIGS. 21A-21B, irregularity, or non-uniformity, can be introduced in an abraded area using feathering techniques. Five lines 2202, 2204, 2206, 2208 and 2210 are drawn from the center of the treated area to the outer untreated area. The pixel measurement along the path is represented in FIG. 22B. The bumpiness 2220 seen in the values across the five samples shows the impact of feathering.

Figure 22C:
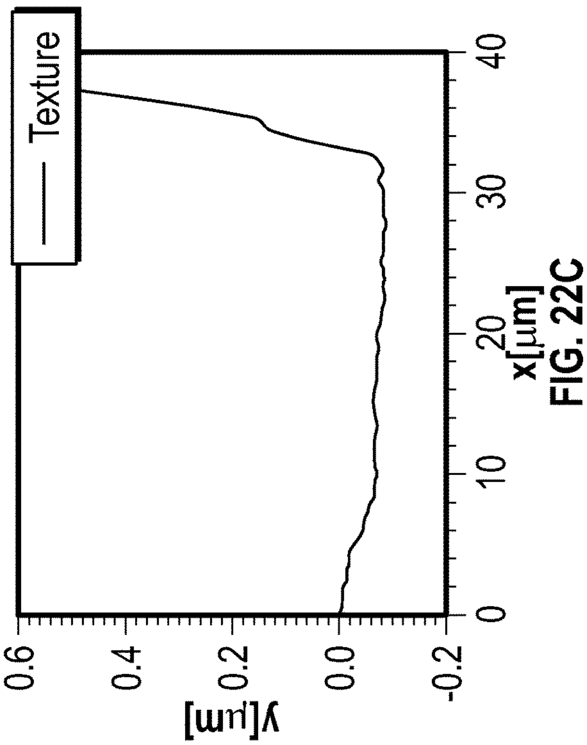

FIGS. 22 and FIG. 23 illustrate mathematically how feathering can be measured, using for example the surface texture, waviness and/or roughness within an area across a path.

Figure 22A:
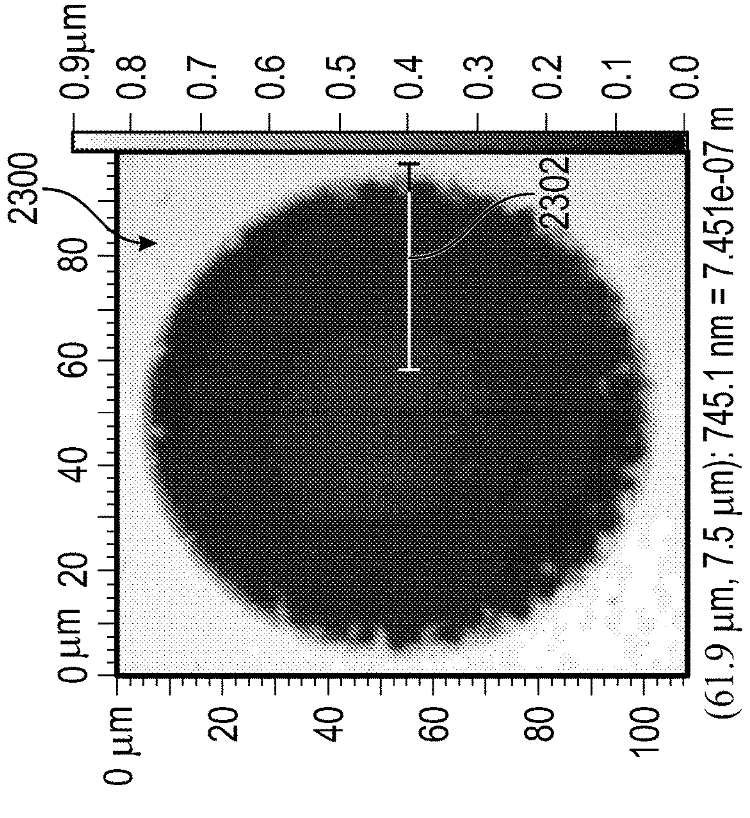

FIG. 22A illustrates a repaired area 2300, with a line 2302 drawn from the center to an unabraded portion. The area was measured across a 10 pixel wide path.

$$S_r = T_r e^{-\left(4\pi\frac{R_q}{\lambda}\cos\theta\right)^2} \quad \text{Equation 10}$$

Where $S_r$ is the light reflected into the specular direction, $T_r$ is the total reflected flux, $R_q$ is the root mean square surface area roughness, $\theta$ is the specular direction, and $\lambda$ is the light wavelength. FIG. 22A illustrates a plot of the surface texture 2310, surface waviness 2320 and surface roughness 2330.

Figure 23A:
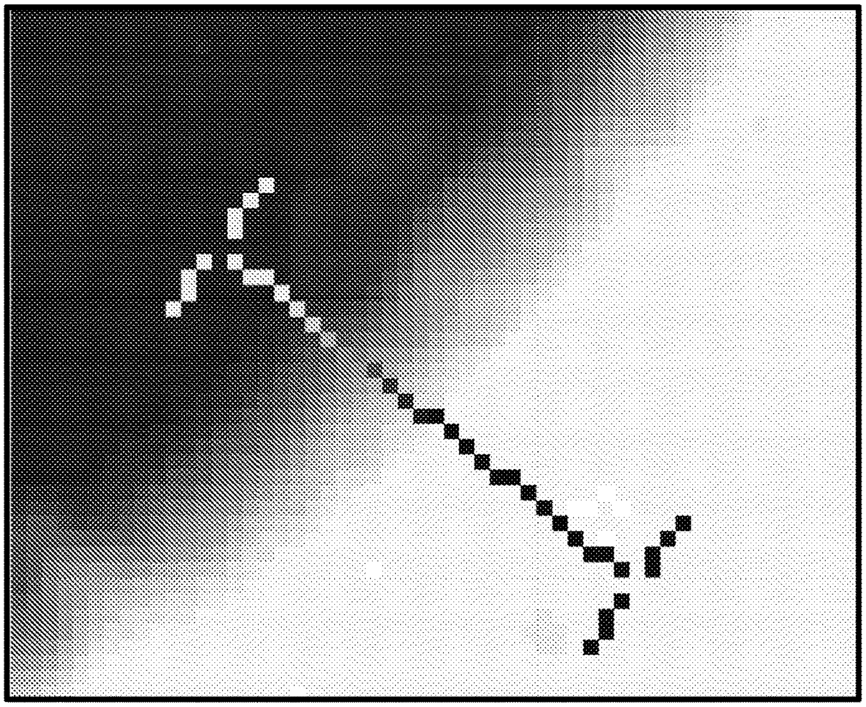
Figure 23B:
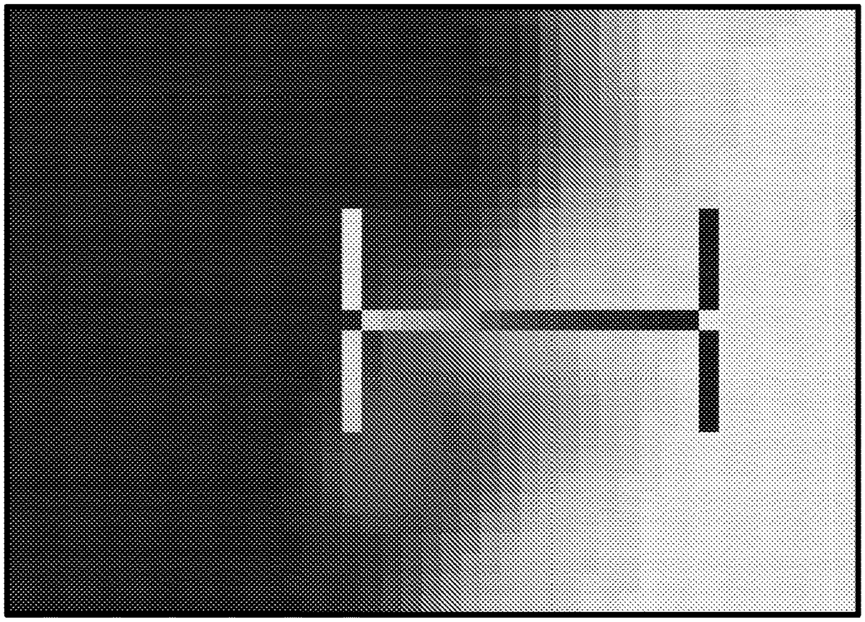

Applying Equation 10 to FIGS. 23A, it is seen that a transition area has less feathering than is needed, with a root mean square of roughness of 81.43. FIG. 23B illustrates higher variability in the area where feathering is present, with a root mean square of roughness of 206.8. The prescribed range of roughness of the orange peel is dependent on the desired aesthetic of the manufacturer and also depending on the position of the vehicle. For instance, a lower panel on a utility vehicle may have orange peel where variability of the orange peel shows very tight transition that appears almost like a rough powder coat which would be expressed as a high roughness number. In another application on the surface of the hood of the vehicle, the orange peel might have a much smoother wavy quality that would be expressed in a lower roughness number.

Figure 24A:
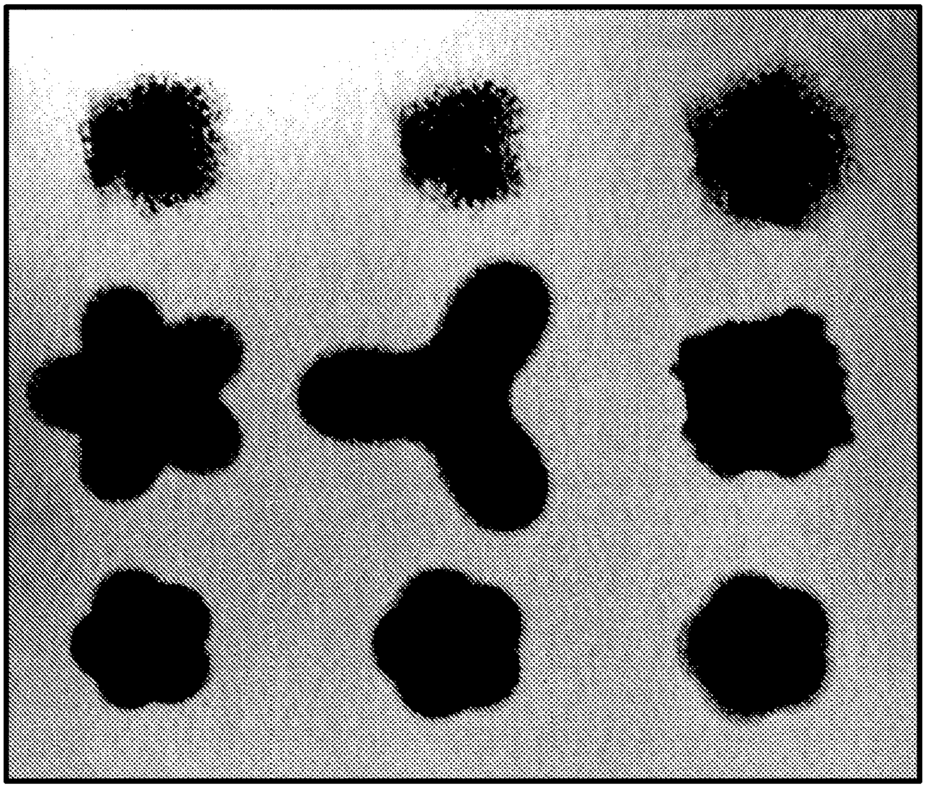
Figure 24B:
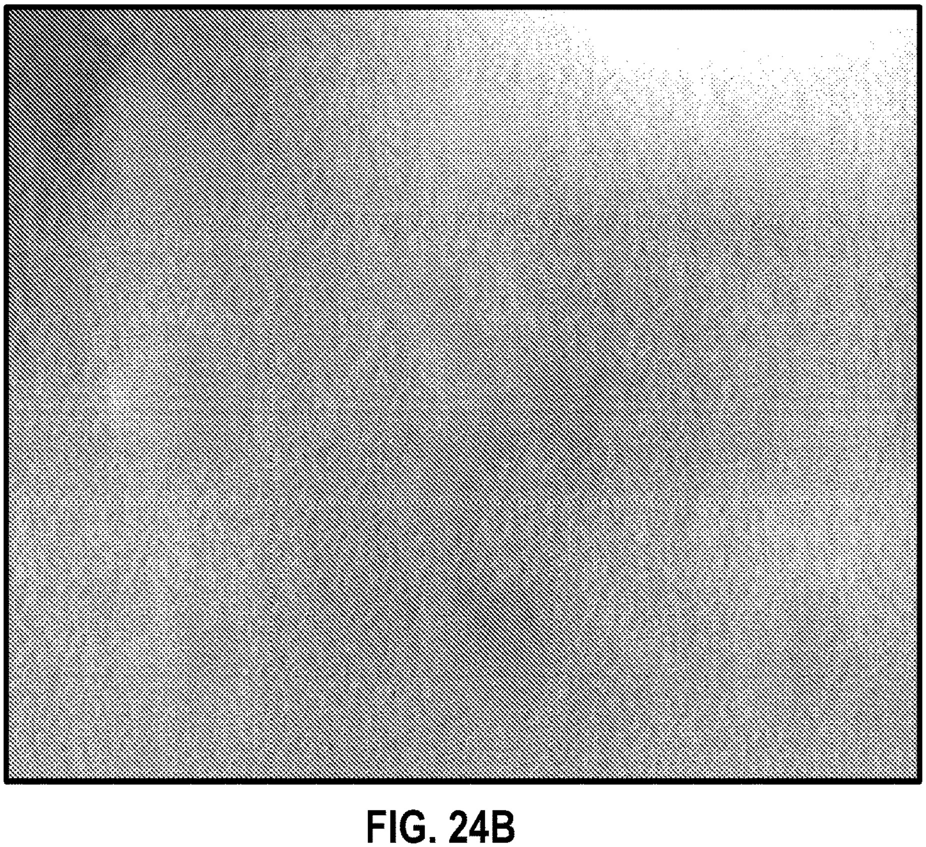

FIGS. 24A and 24B illustrate images taken of repair areas before (FIG. 24A) and after polishing (24B).

What is claimed is:

1. A method for robotically repairing a defect on a worksurface, the method comprising:
- receiving a surface mesh of the worksurface and a surface texture characteristic;
- receiving a location of the defect, wherein the location is a coordinate location corresponding to a point on the surface mesh;
- generating a repair map for repairing the defect, wherein the repair map comprises a repair position and a repair force at the repair position, wherein the repair instructions comprise a concealment feature selected based on the surface texture characteristic, wherein the concealment feature comprises a non-uniform repair area in a non-circular repair boundary;
- generating time parametrization of the repair map;
- sending repair instructions to the repair robot, wherein the repair instructions comprise the repair map and time parameterization; and
- wherein the repair robot comprises a tool configured to contact the defect and abrade the work surface at the defect location, wherein the repair position comprises a position of the tool, and a force comprises a force exerted by the tool on the worksurface.

2. The method of claim 1, wherein the repair boundary has a rotational symmetry that is n-fold with n finite and greater than or equal to 2.

3. The method of claim 2, wherein the rotational symmetry is less than or equal to 25.

4. The method of claim 1, wherein the repair boundary is an epitrochoid or a hypotrochoid.

5. The method of claim 1, wherein the repair boundary is asymmetric.

6. The method of claim 1, wherein the repair boundary is smaller than six times an effective tool radius.

7. The method of claim 1, wherein the repair instructions define a cut depth that is monotonically decreasing radially outward from the center of the repaired area.

8. The method of claim 1, wherein the repair boundary has a convex portion or a concave portion.

9. The method of claim 1, wherein the repair instructions define a repair depth profile that comprises a first depth, with respect to the worksurface, at a first point, and a second depth at a second point, wherein the first and second points are within the repair boundary.

10. The method of claim 1, wherein the repair instructions comprise tilting a backup pad with respect to the worksurface to a non-zero angle.

11. A method for generating a repair trajectory for a worksurface, the method comprising:
- retrieving a worksurface parameter using a worksurface parameter retriever;
- retrieving a defect parameter for a defect on the worksurface using a defect parameter retriever, wherein the defect parameter comprises a location of the defect on the worksurface;
- generating a repair path for the defect using a repair path generator, wherein the repair path comprises a repair position, a repair force, and a repair orientation for a tool contacting the worksurface, wherein the repair path comprises a concealment feature selected based on the worksurface parameter, wherein the concealment feature comprises a non-uniform repair area in a non-circular repair boundary;
- time parameterizing the repair path, using a time parameterizer, to generate a repair trajectory; and
- wherein the method is implemented by a repair robot controller with a processor and stored computer implemented instructions that, when executed, cause the controller to complete the steps of retrieving a worksurface parameter, retrieving a defect parameter, generating a repair path and time parameterizing the repair path.

12. The method of claim 11, wherein the repair boundary has a rotational symmetry that is n-fold with n finite and greater than or equal to 2.

13. The method of claim 12, wherein the rotational symmetry is less than or equal to 25.

14. The method of claim 11, wherein the repair boundary is an epitrochoid or a hypotrochoid.

15. The method of claim 11, wherein the repair boundary is asymmetric.

16. The method of claim 11, wherein the repair boundary is smaller than six times an effective tool radius.

17. The method of claim 11, wherein the repair path defines a cut depth that is monotonically decreasing radially outward from the center of the repaired area.

18. The method of claim 11, wherein the repair boundary has a convex portion or a concave portion.

19. The method of claim 11, wherein the repair path defines a repair depth profile that comprises a first depth, with respect to the worksurface, at a first point, and a second depth at a second point, wherein the first and second points are within the repair boundary.

20. The method of claim 11, wherein the repair orientation comprises tilting a backup pad with respect to the worksurface to a non-zero angle.

* * * * *